Figure 1:
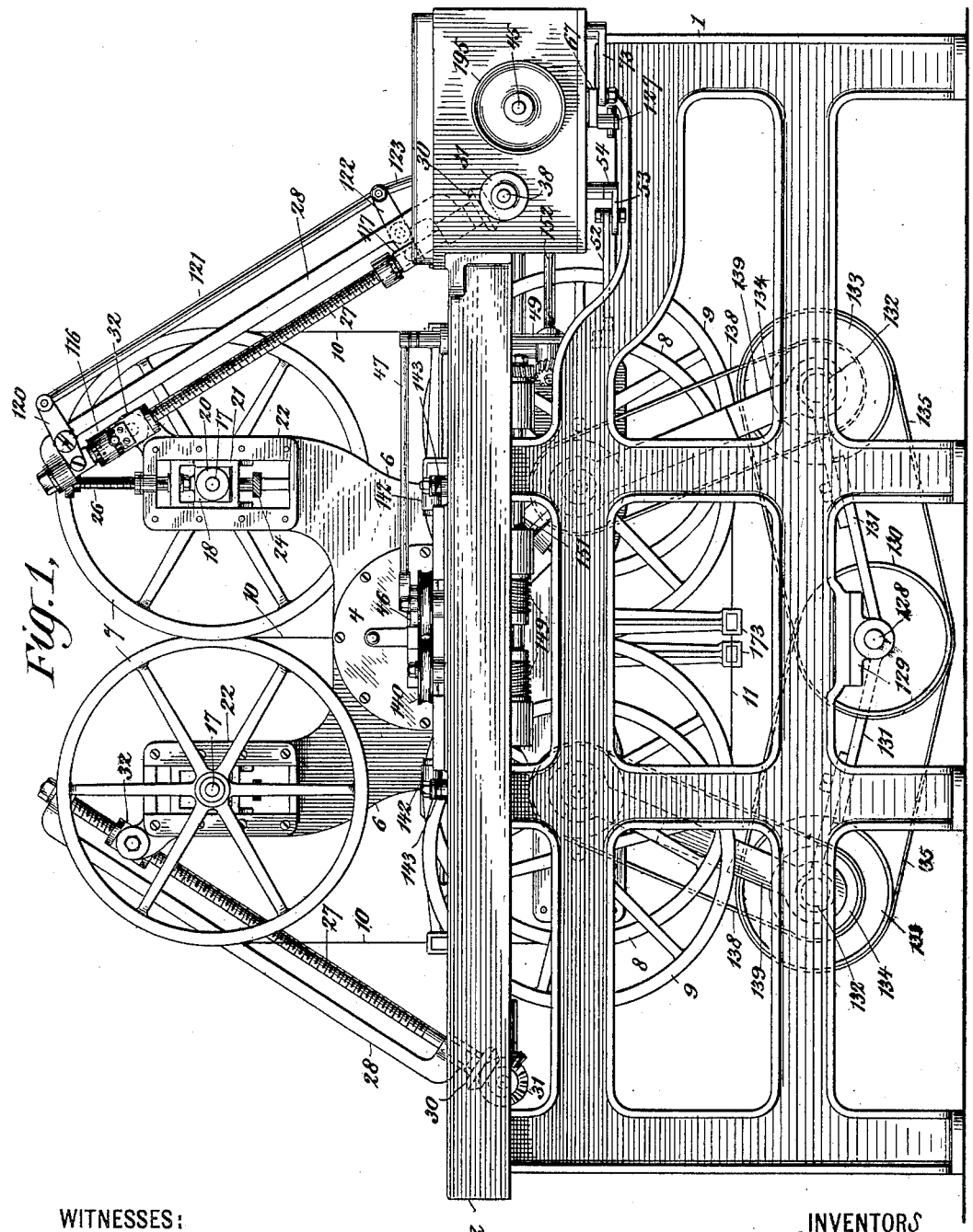

No. 649,676. Patented May 15, 1900.
J. POMEROY & H. W. LARSSON.
MACHINE FOR CUTTING RATAN.
(Application filed Mar. 21, 1898.)

(No Model.) 14 Sheets—Sheet 1.

WITNESSES:

INVENTORS
Julian Pomeroy
Henry W. Larsson
BY
Witter & Kenyon,
ATTORNEYS.

No. 649,676. Patented May 15, 1900.
J. POMEROY & H. W. LARSSON.
MACHINE FOR CUTTING RATAN.
(Application filed Mar. 21, 1898.)

(No Model.) 14 Sheets—Sheet 2.

WITNESSES:

INVENTORS
Julian Pomeroy,
Henry W. Larsson
BY
Witter & Kenyon
ATTORNEYS.

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 3.

WITNESSES:

INVENTORS
Julian Pomeroy
Henry W. Larsson
BY
Witter & Kenyon
ATTORNEYS.

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 5.

WITNESSES:

INVENTORS
Julian Pomeroy
Henry W. Larsson
BY
Witter & Kenyon
ATTORNEYS.

No. 649,676. Patented May 15, 1900.
J. POMEROY & H. W. LARSSON.
MACHINE FOR CUTTING RATAN.
(Application filed Mar. 21, 1899.)
(No Model.) 14 Sheets—Sheet 6.
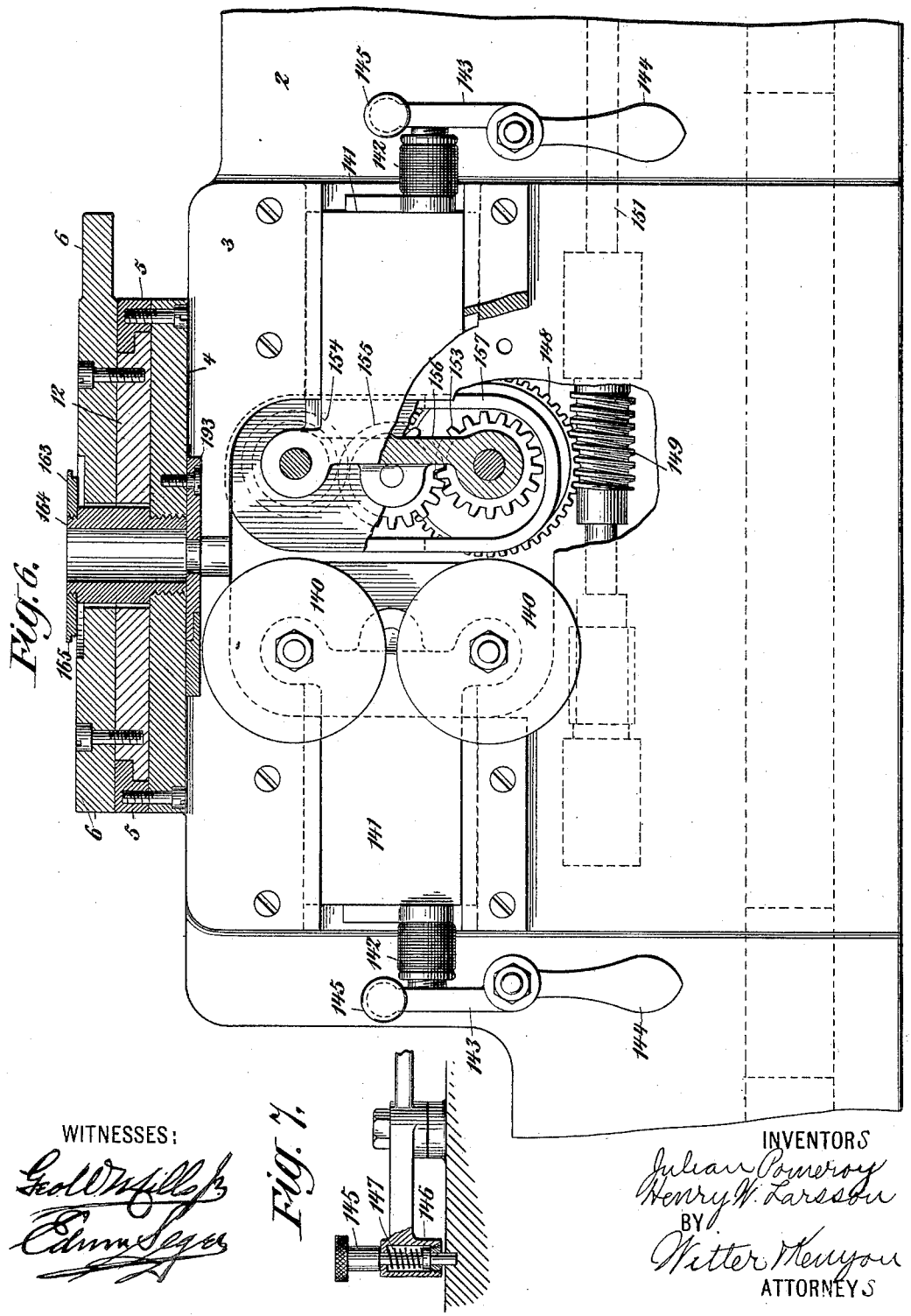
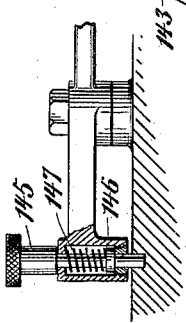
WITNESSES:
INVENTORS
Julian Pomeroy
Henry W. Larsson
BY
Witter Kenyon
ATTORNEYS
THE NORRIS PETERS CO., PHOTO-LITHO., WASHINGTON, D. C.

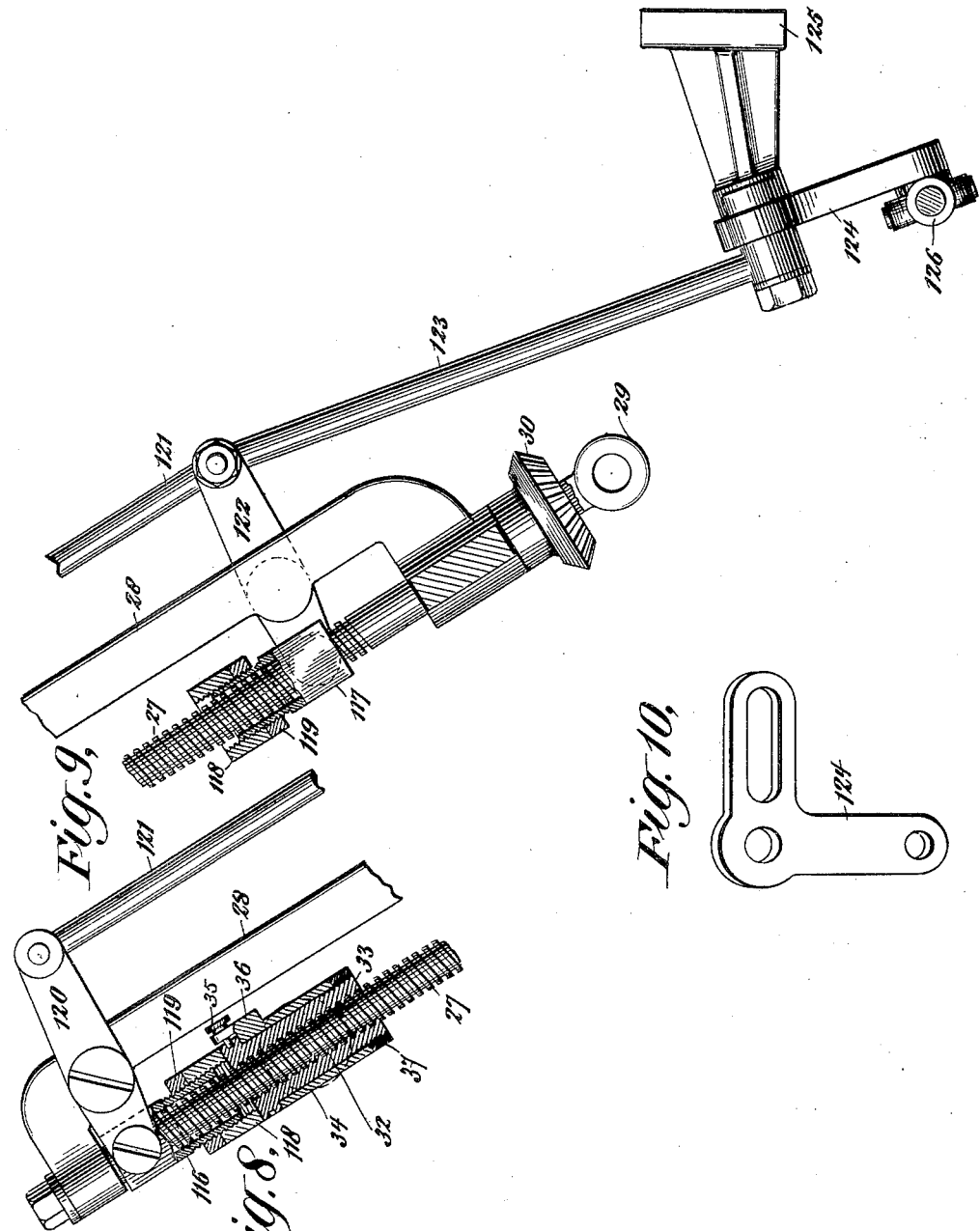

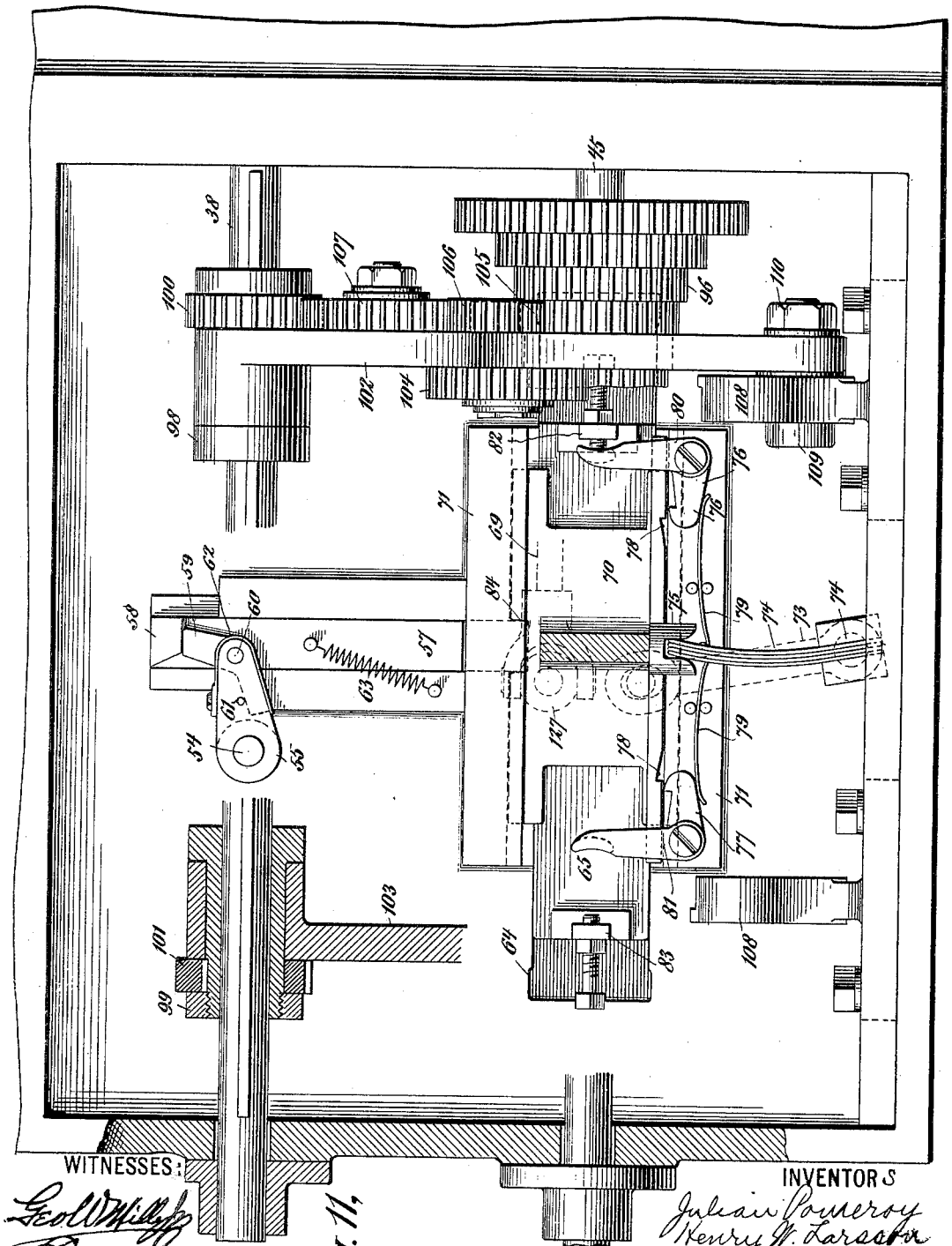

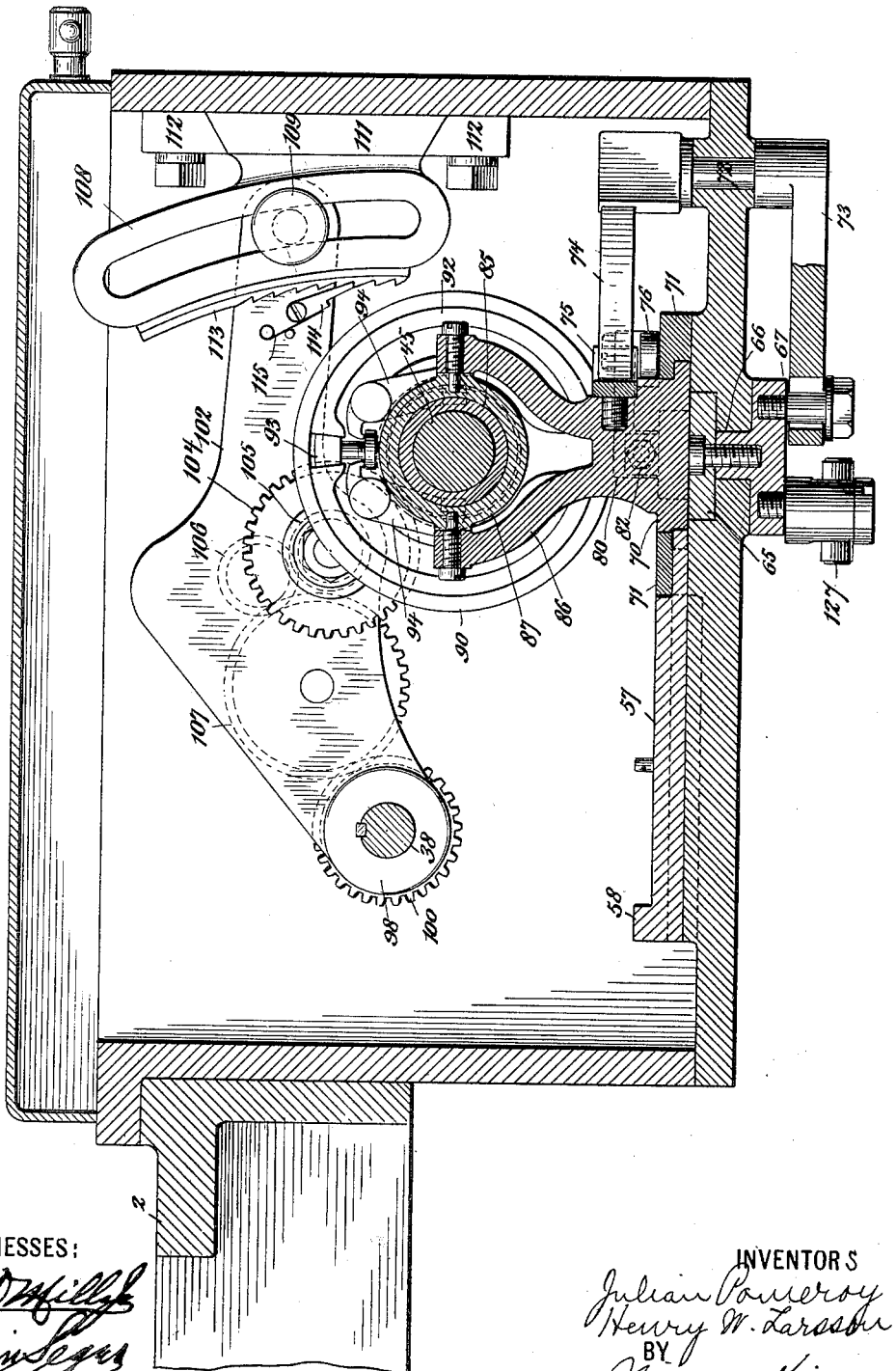

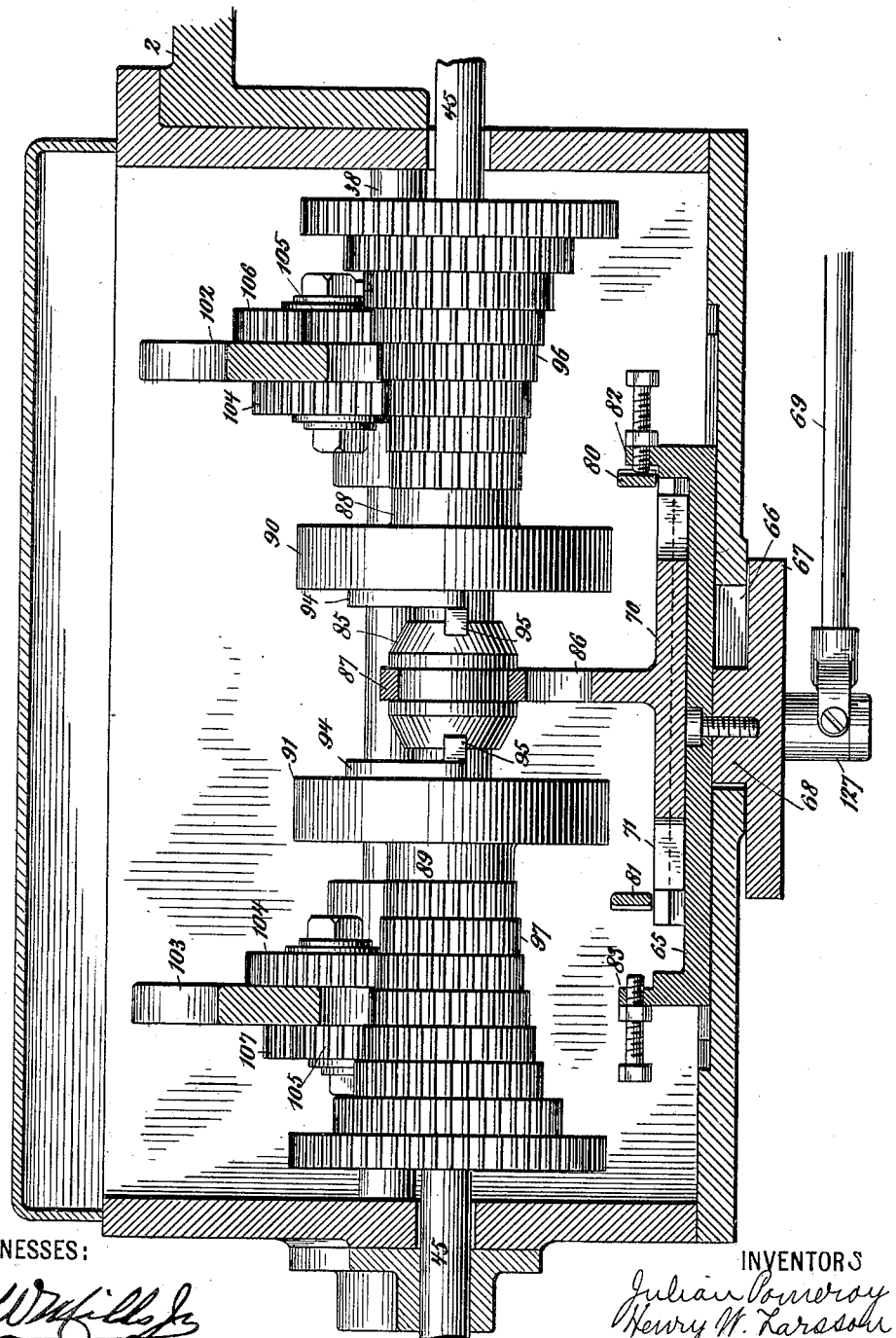

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 11.

WITNESSES:

INVENTORS
Julian Pomeroy
Henry W. Larsson
BY
Witter & Kenyon
ATTORNEYS.

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 12.
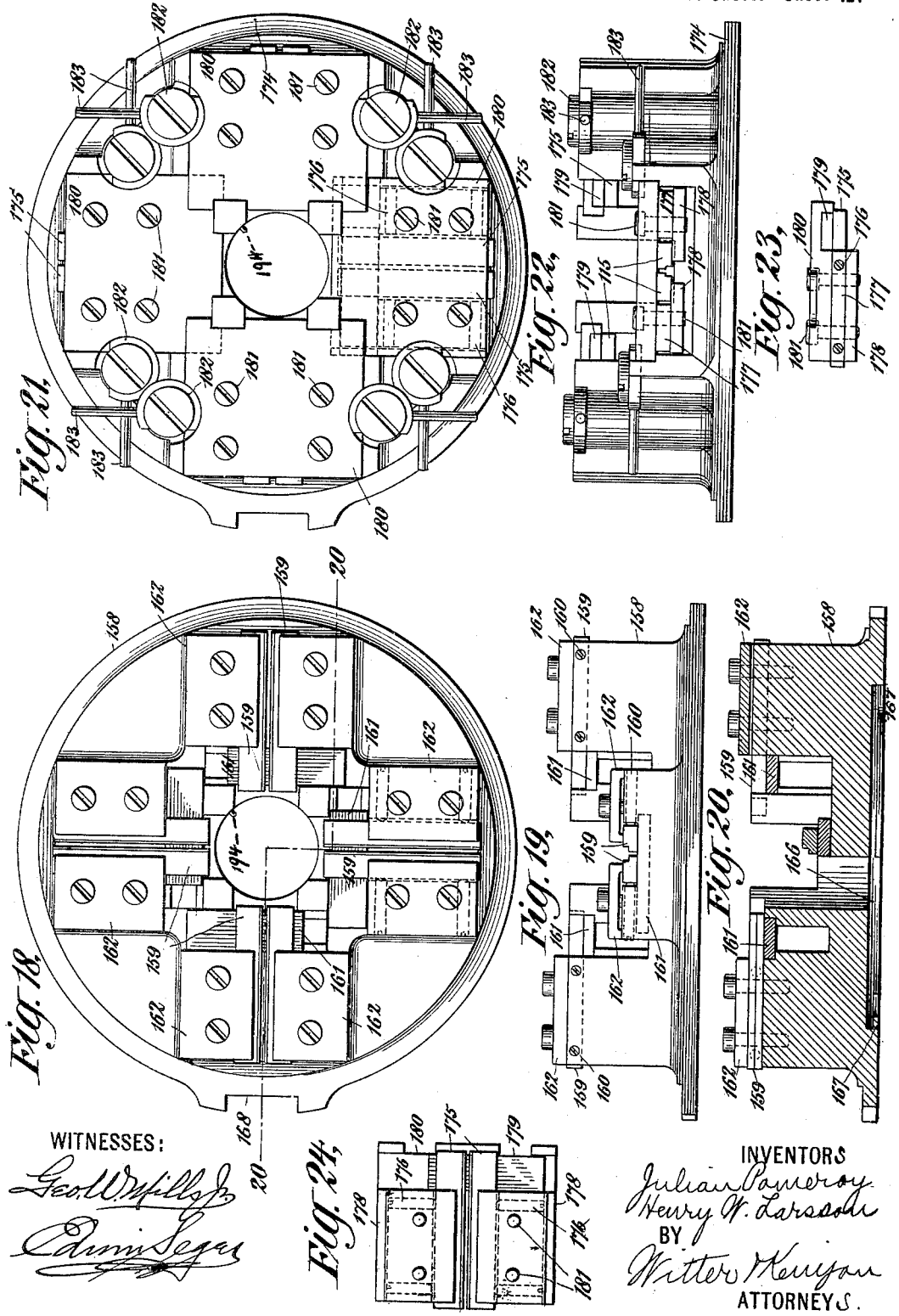
WITNESSES:
INVENTORS
Julian Pomeroy
Henry W. Larsson
BY
Witter & Kenyon
ATTORNEYS.
THE NORRIS PETERS CO., PHOTO-LITHO., WASHINGTON, D. C.

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 13.
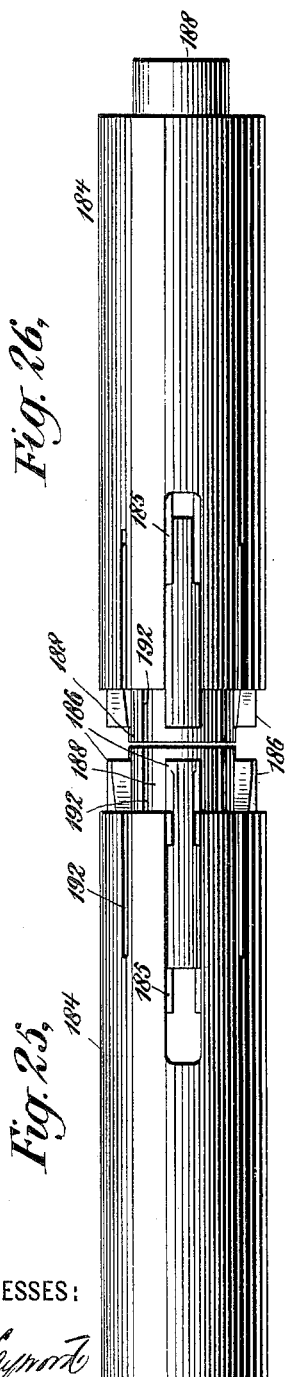
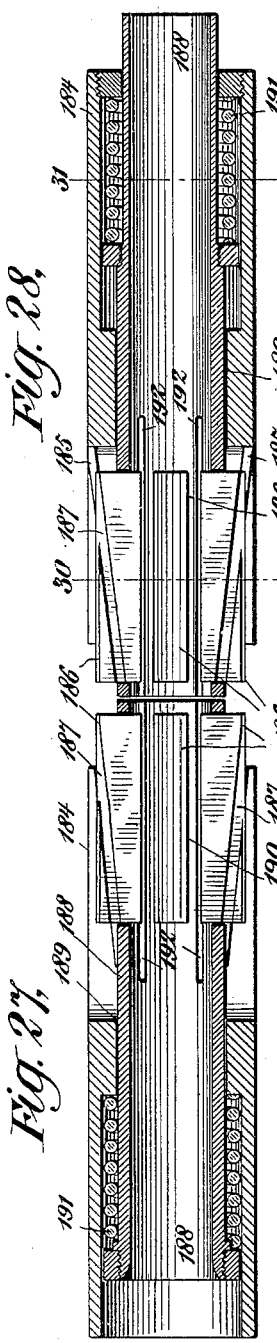
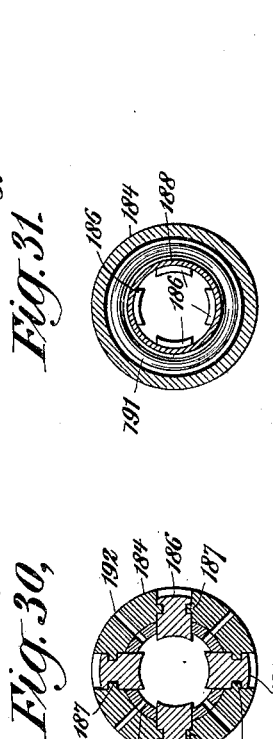
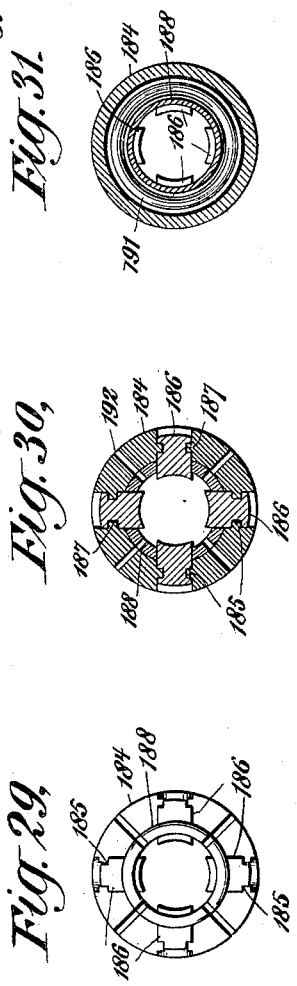
WITNESSES:
INVENTORS
Julian Pomeroy
Henry W. Larsson
BY
Witter & Kenyon
ATTORNEYS.

No. 649,676. Patented May 15, 1900.
J. POMEROY & H. W. LARSSON.
MACHINE FOR CUTTING RATAN.
(Application filed Mar. 21, 1898.)
(No Model.) 14 Sheets—Sheet 14.

WITNESSES:
INVENTORS
Julian Pomeroy
Henry W. Larsson
BY
Witter & Kenyon
ATTORNEYS.

UNITED STATES PATENT OFFICE.

JULIAN POMEROY AND HENRY W. LARSSON, OF SPRINGFIELD, MASSACHUSETTS; SAID LARSSON ASSIGNOR TO SAID POMEROY.

MACHINE FOR CUTTING RATAN.

SPECIFICATION forming part of Letters Patent No. 649,676, dated May 15, 1900.

Application filed March 21, 1898. Serial No. 674,570. (No model.)

*To all whom it may concern:*

Be it known that we, JULIAN POMEROY, a citizen of the United States, and HENRY W. LARSSON, a subject of the King of Sweden and Norway, both residing at Springfield, in the county of Hampden and State of Massachusetts, have invented a new and useful Machine for Cutting or Splitting Ratan, Wood, or other Material, of which the following is a full, clear, and exact specification, reference being had to the accompanying drawings, which form a part hereof.

The invention relates to a machine for cutting or splitting stalks or pieces of ratan, wood, or any other material, and it is especially designed for the splitting of ratan or similar stalks into uniformly-tapering strips or parts which are suitable for use in the manufacture of whips, fishing-rods, or similar articles.

Heretofore, so far as we are aware, it has been the practice in the manufacture of whips and articles of this kind to divide the stalk into two or at the most into four strips, and then by a succession of operations to trim the sides of these strips, and thus prepare them for being put together or combined so as to form the completed whip. These old methods of manufacture have involved a large number of separate operations, each one necessarily increasing the cost of the product. Moreover, these operations have been more or less complicated, requiring expensive machinery and a large amount of labor. The article formed thereby has been in many respects imperfect and unsatisfactory. Moreover, by these old methods it has never been possible to make more than one whip out of a single stalk of ratan or similar material, and frequently more than one stalk has been required for each whip.

The objects of the present invention, generally speaking, are to simplify the construction of the machinery for splitting the material, to make the operation of the machine entirely automatic, to increase the accuracy of its operation, and to decrease the cost, while at the same time improving the quality of the product.

Another object of the invention is to provide a device whereby a single piece or stalk of material can be cut into eight equal portions or strips of full or proper size at the butt portion and equally tapering throughout the rest of the strip, whereby two complete and perfect whips or similar articles can be made from a single stalk.

Another object of the invention is to cause the stalk or other material to be split accurately along its axis or median line, whereby the material will be divided into a certain number of equal portions adapted to form whips and other articles that are regular and uniform in shape and outline.

Another object of the machine is to automatically regulate the length of the butt portion and tapered portion of the strips.

The invention is also designed to accomplish other objects, which will be fully described hereinafter.

The invention consists, first, of the combination, in a machine of the character specified, of a plurality of cutter-frames adapted to revolve in opposite directions around the path of the material or the center line thereof and cutters carried by these frames and mechanism for revolving or turning the frames in opposite directions around the material, whereby the cutter or cutters of one frame cut or split the material diagonally in one direction, while the cutter or cutters of the other frame cut or split the material diagonally in the other direction at the same time. In the best form of our invention we employ two frames, and we provide each frame with two band-saws carried by suitable wheels mounted in bearings in the frame, whereby the stalk or material can be cut into eight equal parts.

Our invention also consists in providing each cutter-frame with two band-saws carried upon suitable wheels and so arranging the saws of each frame that these two saws will cross each other at right angles at the center of the material or the line of cutting, and in arranging each frame so as to revolve an eighth of a circle in one direction and then an eighth of a circle in the reverse direction, whereby at the beginning of the cutting the two saws of one frame are in line with the two saws of the other frame, so as to cut the butt portion of the material, and the saws are then revolved in opposite directions, so as to cut in different paths until when each frame has revolved an eighth of a circle the two saws of one frame are again in line with the two saws of the other frame, so as to cut the butt portions at the other end of the stalk.

The invention also consists in providing the revolving frames with guides for the cutters or saws, which guides are adapted to revolve with the frames. In the best form of our invention these guides are mounted on independent fixed bearings in the frame of the machine, so as to have no sidewise motion, whereby the saws are guided with greater accuracy during the cutting.

The invention also consists in the special construction of these guides.

The invention also consists in certain devices and combinations of devices for revolving or turning the saw-frames. These devices consist in a revolving screw suitably supported and a nut traveling on the screw and connected with the saw-frame and means for revolving the screw. This part of the invention also includes mechanism for stopping the saw-frames at the proper time and for making the frames act properly in unison with each other. In the complete invention two shafts are employed—a driving-shaft for the two saw-frames and a second shaft, which is preferably the main driving-shaft of the machine. These two shafts are adapted to be connected with each other by a clutching device. One of the revolving screws for driving the frames is provided with sliding sleeves at its ends, against which the traveling nut strikes. When the nut strikes the sleeves, the clutching device, by means of intervening mechanism, is made to disconnect the two shafts, and the saw-frames are thereby brought to rest.

The invention also consists in mechanism for automatically starting the saw-frames at the proper time. The mechanism comprises a pivoted arm or lever lying in the path of the material and adapted to be moved upon its pivot and thereby, through intervening mechanism, to put into operation the devices for driving the saw-frames and to thereby start the saw-frames. In the best form of our invention this pivoted arm or lever is connected with the clutching device adapted to connect the two shafts already referred to, so that when the material strikes or moves the pivoted arm or lever the two shafts are operatively connected and the saw-frames are made to revolve. The pivoted arm or lever is put at such a point in the passage of the material that the material will strike it when a sufficient length of material has been cut to form the butt of the whip.

The invention also consists in the construction and arrangement of the clutching device for connecting the two shafts and the means for connecting this clutching device with the saw-frames and with the pivoted arm or lever adapted to be moved or tripped by the material.

The invention also consists in certain mechanism for driving the saw-wheels which carry the band-saws, whereby these wheels can be continuously and properly revolved, notwithstanding the revolution of the saw-frames and whether the saw-frames are in motion or at rest.

The invention also consists in a centering chuck or device suitably mounted in the machine and adapted to keep the center or axis of the stalk always in line with the center of the machine or with the axis about which the saw-frames revolve, notwithstanding any irregularities that may exist in the size or shape of the different parts of the same stalk. This centering chuck or device is provided with clamping-jaws moving in ways in the chuck and normally pressed against the material, the jaws being so constructed and arranged as to move in or out with one another toward or away from the material, so that the jaws are always maintained at an equal distance from the axis of the chuck. In the best form of our invention the clamping-jaws are made to move in inclined ways diverging toward the rear of the machine, so that when any part of a stalk that is too large to pass through the jaws comes in contact with the jaws the latter are moved backward and outward until they are sufficiently open to permit the stalk to pass through them, the stalk being all the time held by the jaws in a central position.

In our complete machine two centering-chucks are employed, one for each saw-frame, the jaws of the front chuck being placed at the rear end of said chuck and the jaws of the rear chuck being placed at the front end of said chuck, whereby the jaws of the two chucks are in close proximity to one another between the saw-frames and combine to support the material firmly in a central position near the point where the material is split by the cutters.

The invention also consists in the combination of suitable feed-rolls adapted to bear upon opposite sides of the material and to feed it through the machine, the feed roll or rolls on each side being mounted in bearings in a sliding plate pressed toward the material with a yielding or spring pressure, the shaft of one of the rolls on each side being provided with a worm-wheel and worms on a driving-shaft with which the worm-wheels mesh and upon which the worm-wheels ride without becoming disengaged therefrom, whereby the rolls clamp the material firmly, but with a yielding pressure, so as to accommodate any variations in the size or shape of the stalks, and whereby the connection between the rolls and their driving-shaft is maintained, no matter in what position the feed-rolls may be.

The invention also consists in many other features of construction and combinations of parts hereinafter described and claimed.

In the drawings accompanying this specification we have shown and in the specification described a complete machine embodying all the different features of our invention; but we desire to have it understood that certain parts of our invention and certain subcombinations of parts may be used separately or in machines the other parts of which differ from what is herein described.

Our invention is fully shown in the accompanying drawings, in which—

Figure 2:
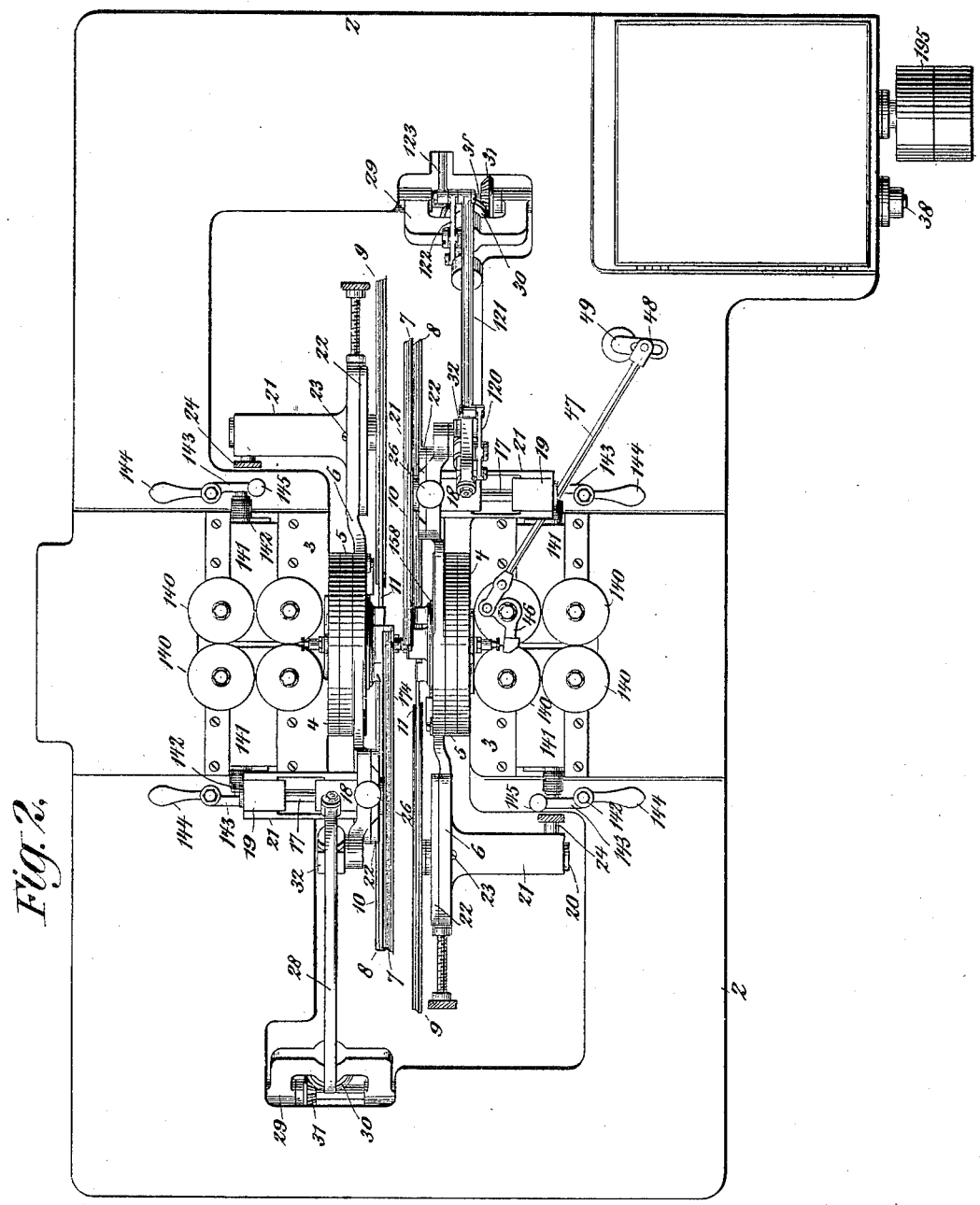
Figure 3:
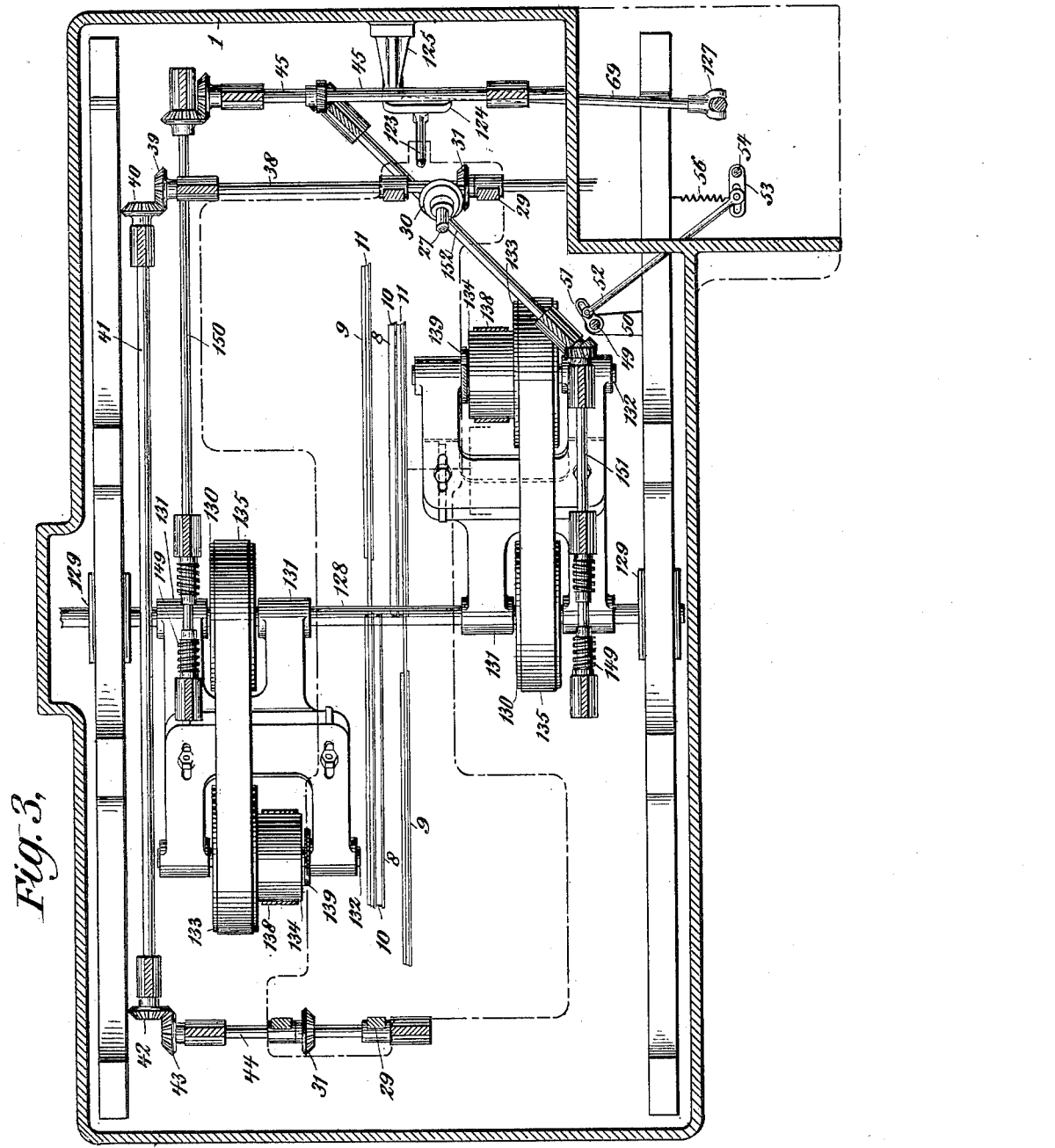
Figure 4:
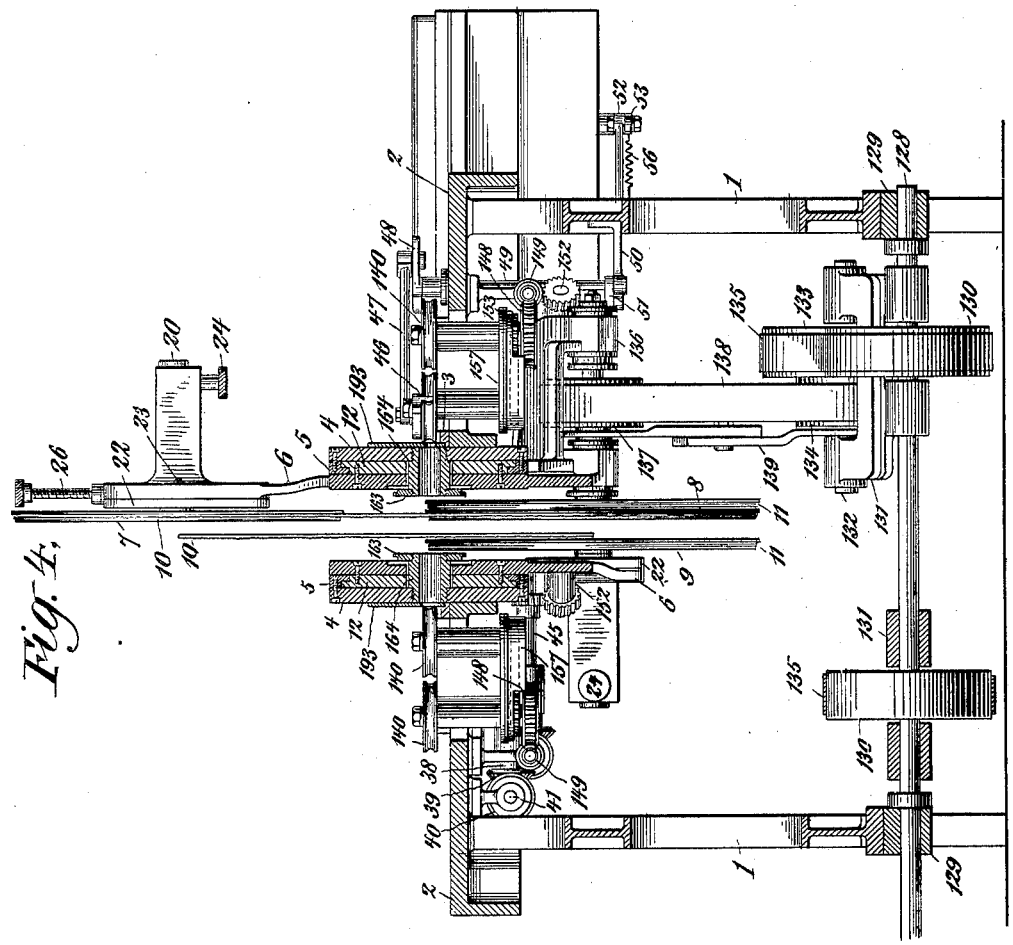
Figure 5:
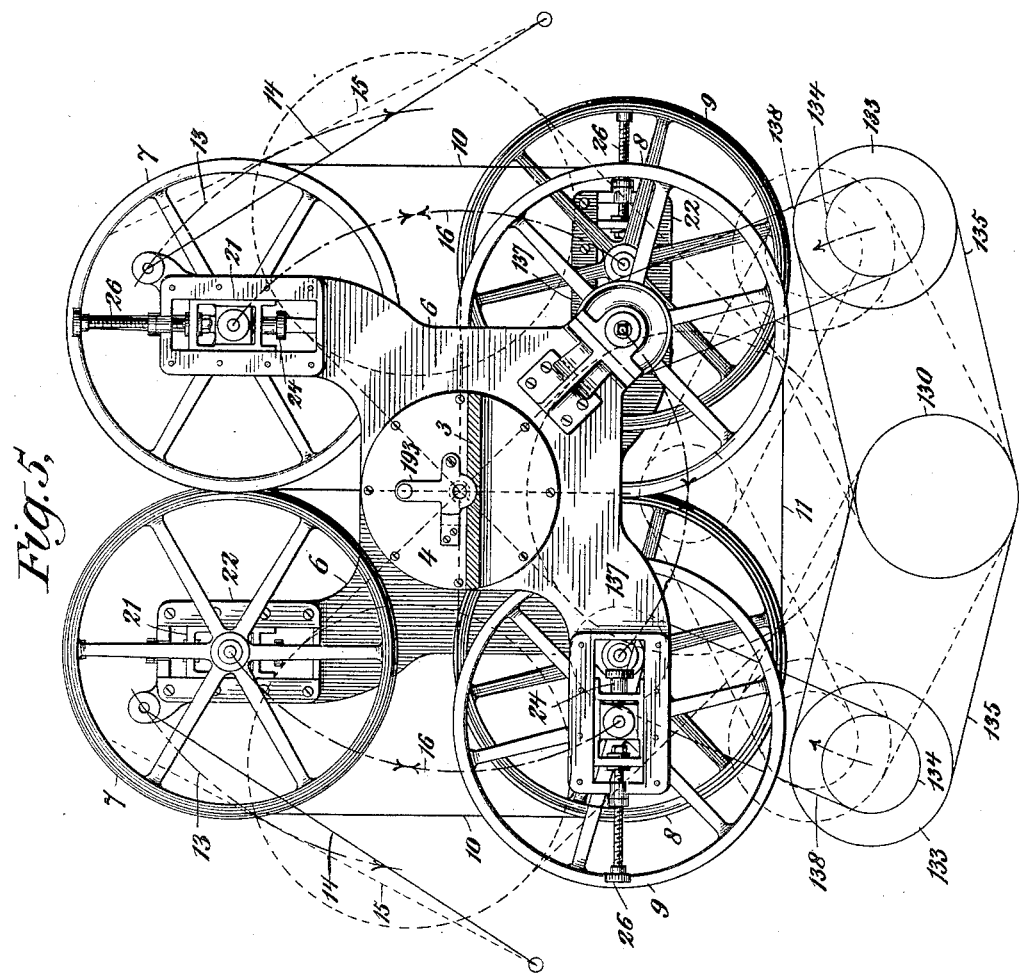
Figure 16:
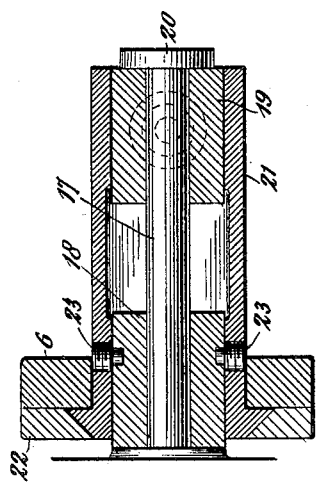
Figure 17:
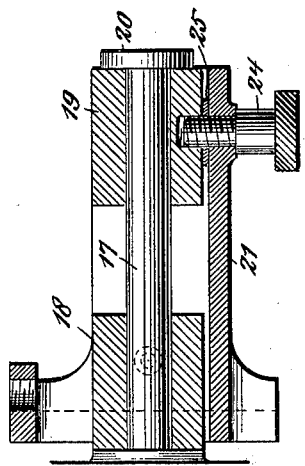
Figure 14:
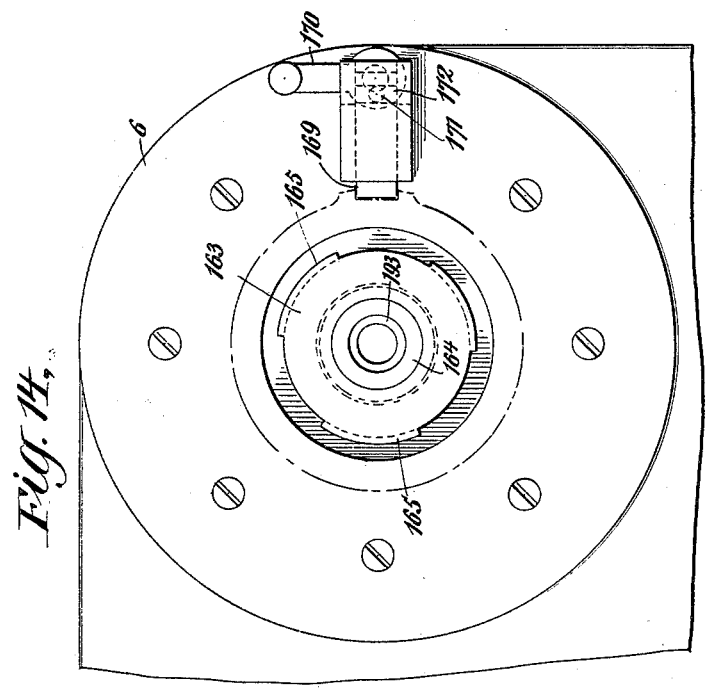
Figure 15:
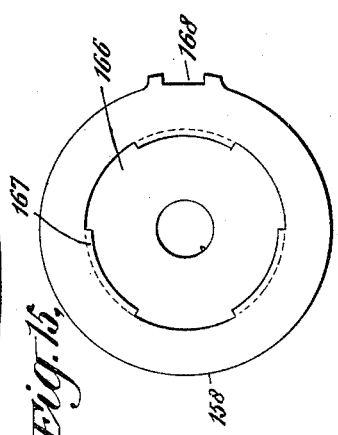
Figure 32:
Figure 33:
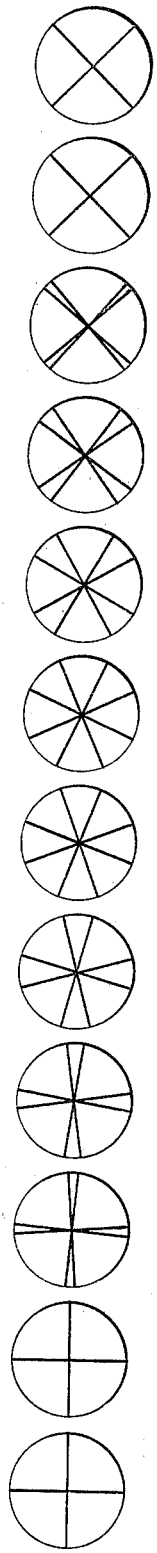

Figure 1 is a rear elevation of the machine. Fig. 2 is a top view. Fig. 3 is a horizontal section taken just beneath the top plate of the machine, certain parts being omitted and certain other parts being shown diagrammatically. Fig. 4 is a central longitudinal vertical section through the machine, the saw-guides and the centering-chucks being omitted. Fig. 5 is a view in detail of the saw-frames and their appurtenances, their direction and extent of movement being shown in broken lines. Fig. 6 is a top view, partly broken away, of one set of feed-wheels and a horizontal section through the supporting-plate upon which one of the saw-frames turns. Fig. 7 is a detached detail view of the lock employed for the spring or buffer which presses against the sliding plate carrying the feed-rolls. Fig. 8 is an enlarged detail view, partly in section, of the upper end of a feed-screw for operating the saw-frame, having a sliding sleeve and connected parts for automatically stopping the revolution of the screw. Fig. 9 is a similar view of the lower end thereof, showing also the connection between the sliding sleeves and the bell-crank lever and connecting-rod through which connection is made with the clutching device. Fig. 10 is a detail view of the bell-crank lever. Fig. 11 is a top view, partially in section and with certain parts broken away, of the clutching device for controlling the motion of the saw-frames. Fig. 12 is a central vertical cross-section through the clutching device. Fig. 13 is a vertical longitudinal section through the sliding plates operating the clutching device and an elevation of the sleeves turning on the main shaft and carrying the gear-cones. Fig. 14 is a view of the inner face of a portion of one of the saw-frames, illustrating the means for locking one of the saw-guides thereto. Fig. 15 is a view of the inner face of one of the saw-guides. Fig. 16 is a horizontal section through the bearings of the upper right-hand saw-wheel shown in Fig. 1. Fig. 17 is a vertical section at right angles to the section of Fig. 16. Fig. 18 is a detail face view of the rear saw-guide detached from its saw-frame. Fig. 19 is a side elevation of the same. Fig. 20 is a section on the line 20 20 of Fig. 18. Fig. 21 is a face view of the front saw-guide. Fig. 22 is an elevation of the same. Fig. 23 is a detail view of certain parts detached. Fig. 24 is an under face view of the same parts. Fig. 25 is an outside view of the front centering-chuck, and Fig. 26 is a similar view of the rear centering-chuck, these two chucks being shown in the same relative position that they occupy when in place in the machine. Figs. 27 and 28 are corresponding longitudinal sections. Fig. 29 is an end view of Fig. 25 looking from right to left. Fig. 30 is a section on the line 30 30 of Fig. 28. Fig. 31 is a section on the line 31 31 of Fig. 28 looking from right to left. Fig. 32 is a diagrammatic view of a stalk of ratan or other material, showing the lines of the cuts made by the saws. Fig. 33 shows a series of cross-sections illustrating the same.

Similar numbers indicate similar parts in the different figures.

Referring more particularly to Figs. 1, 2, 4, 5, and 6, 1 is the frame of the machine, carrying the top plate 2. This top plate is secured in any suitable way to a supporting-plate 3, having a vertical bearing-plate 4, upon which the saw-frame is adapted to turn. The bearing-plate is provided with an annular ring 5, fastened in any suitable way to the rim or outer edge of the bearing-plate. 6 is the saw-frame, provided with the saw-wheels 7, 8, and 9, which are mounted in suitable bearings in the saw-frames and which carry the band-saws 10 and 11. The saw-frame is provided with an annular plate or ring 12, fastened to it at its middle part. The plate or ring 12 has a dovetail connection with the bearing-plate 4 and the annular ring 5, so that the ring 12 and the saw-frame 6 are thereby supported in a central position in the machine, and the plate 12 is adapted to revolve in its bearings, and with it the saw-frame 6. By this means the saw-frame is so mounted in the machine as to revolve around the center line of the path which the material is to take when passing through the machine. The saw-frame can be turned or revolved in either direction, and its motion is controlled by mechanism hereinafter described.

Each saw-frame is provided with three saw-wheels, the middle saw-wheel 8 being mounted in fixed bearings in the saw-frame, as shown in Fig. 5, and the saw-wheels 7 and 9 being mounted in bearings adjustable in the saw-frame. The middle wheel 8 is a double wheel— that is to say, it is provided with two flanges, as shown in Figs. 2 and 4, so as to carry and partially support both of the saws 10 and 11. The saw 10, for example, passes around the upper wheel 7 and then around through one of the channels of the wheel 8, formed by one of its circumferential flanges. The other saw 11 passes around the wheel 9 and then around through the other channel of the wheel 8, formed by its other circumferential flange. Motion is imparted, as will be hereinafter more fully explained, to the shaft of the middle wheel 8, and as a result of the construction already described both band-saws are operated at the same rate of speed, motion being imparted to the wheels 7 and 9 from the wheel 8 through the band-saws. It will also be observed that the wheels are so mounted in the frames that the saws 10 and 11 cross each other at right angles at the point of cutting or at the center line of the path of the material. The saws 10 and 11 will therefore make cuts in the material at right angles to each other.

The machine is provided with two saw-frames such as we have just described. These are arranged so as to face each other as shown in the drawings, as a result of which the saws of one frame are brought as near as possible to the saws of the other frame. The two frames, with their wheels and saws, are constructed exactly alike and are operated from the same shaft, as will be hereinafter described; but they are so connected with this shaft that they revolve in opposite directions at the same time. In the best form of our invention we so construct these frames that they are made to revolve forty-five degrees, or an eighth of a circle, in one direction and then are brought to rest for a certain length of time and then are made to revolve forty-five degrees, or an eighth of a circle, in the other direction and are again brought to rest. When the material is first fed to the saws and during the first part of the cutting operation, the saws of one frame are in line with the saws of the other frame, so that the material is cut into four equal parts. This cutting is continued until a sufficient length has been cut to form the butt of the whip or other article. Then the frames are caused to revolve one in one direction and the other in the other direction for an eighth of a circle, thereby cutting that portion of the stalk into eight equal tapering parts. The saws of the two frames will again be in line with one another, and the frames are then brought to rest by suitable mechanism, so that during the last portion of the cutting operation the material is again cut into four equal parts, thereby forming the butt portions for the second whip or article to be formed from this single piece of material. In this construction the frames are not only revolved in opposite directions at the same time, but they are revolved at the same speed and are provided with means for starting them simultaneously and for stopping them simultaneously. The movement and operation of these frames are clearly illustrated in Fig. 5, the three wheels of one frame being shown in white and the three wheels of the other frame being shown with parallel shading lines. The saws are represented in full lines in the position that they occupy at the beginning of the cutting and are represented in dotted lines in the position that they occupy at the end of the cutting. The broken lines 13 represent the path of motion of the axis of the pivot connecting the frames with the traveling nuts on the operating-screws.

The lines 14 14 represent the position of the axis of the revolving screw at the beginning and also at the end of the revolution of the saw-frame. The broken lines 15 15 represent the position of the axis of the revolving screw at the middle point of revolution of the frame—that is to say, when the frame has revolved a sixteenth of a circle. The broken lines 16 16 represent the path of motion of the saw-wheel shafts, and at the middle point, which is marked on the drawings, the shaft of the wheel 7 of one frame comes in line with the shaft of the wheel 9 of the other frame.

The construction of the adjustable bearings of the two end wheels is shown in Figs. 1, 4, 5, 16, and 17. 17 is the shaft of the saw-wheel, upon which the saw-wheel is adapted to turn freely. This shaft is mounted in two boxes—the inner box 18 and the outer box 19—and is held in place lengthwise by the collar 20. These boxes are carried in a sliding yoke 21, which is adapted to slide in a groove or suitable way formed between the arm 6 of the saw-frame and the clamping-plate 22, bolted or otherwise suitably fastened to the frame, as fully shown in Fig. 16. The inner box 18 is pivoted in the sliding yoke by means of the two pivots or pins 23, so that this box, and with it the shaft 17, can be turned or tilted upon an axis at right angles to the line of travel of the saw at its point of cutting, whereby the tilting of the shaft 17 will not tend to move the saw out of its proper line of travel. The outer box 19 is adjustably fastened to the sliding yoke 21 by means of the set-screw 24. (Shown in Fig. 17.) This set-screw passes through the bottom of the sliding yoke and takes into a threaded hole in the box 19, so that by turning the screw 24 box 19 can be moved back and forth in the yoke 21, and the shaft 17 can thereby be tilted on the pins 23 23 and brought and held in any desired position. We prefer to insert an elastic washer 25 between the box 19 and the yoke. By turning the screw so as to draw down the box 19 when in the position shown in Fig. 17 the shaft 17 can be tilted on its axis and the saw-wheel can thus be tilted so as to cause the band-saw to run close to the flange of the wheel, or by turning the screw in the other direction the band-saw can be made to run nearer the outer edge of the surface of the wheel. The tension of the saw can also be regulated to some extent in this way. As the position of the saw and its tension must be nicely regulated in this machine in order to do accurate work this adjustable bearing is an important feature.

The sliding yoke 21 can be moved up and down in grooves or ways by means of the set-screw 26, which is fastened at its lower end to the sliding yoke and is adapted to turn in a threaded hole in the saw-frame. This affords additional means for adjusting the position of the saw-wheels, and thereby the position and tension of the saws. In this way the bearings of the wheels 7 and 9 are made adjustable toward or away from the bearings of the middle or adjacent wheel 8.

The mechanism for turning or revolving the saw-wheels is shown particularly in Figs. 1, 2, 3, 8, 9, and 10. Each saw-frame is provided with a revolving screw journaled in bearings in a suitable frame 28 and adapted to be held in proper position in the frame by means of nuts or other suitable devices. The lower end of the frame 28 is made in the form of a yoke 29, (see Fig. 2,) and these yokes are pivoted upon the shafts which drive the saw-frames, as a result of which the frames can be rocked upon these shafts without disengaging the connecting-gears. Each screw 27 is provided at its lower end with a beveled gear 30, which engages with a beveled gear 31 on the driving-shafts. Each screw is provided with a nut 32, adapted to travel thereon and pivotally connected with one of the saw-frames. When the screw is revolved, the nut is caused to travel up or down on the screw, according to the direction of its revolution, and thereby to revolve the saw-frame with which it is connected. The special construction of this nut is shown in Fig. 8. It consists of the inner portion or nut proper, 33, and the outer shell 34, which surrounds the nut 33 and which is attached to the saw-frame. One end of the nut 33 is enlarged, as shown in Fig. 8, and is provided with a series of holes. 35 is a screw-pin adapted to turn in a threaded hole in a lug 36, fastened to the shell 34 and projecting over the series of holes in the nut 33. The position of the nut upon the revolving screw can be adjusted by screwing out the pin 35 and then turning the nut proper, 33, upon the screw, the nut proper being adapted to turn in the shell 34. When the nut has been brought to a proper position on the screw, the pin 35 is screwed into one of the holes in the nut, and the nut is thereby prevented from turning on the screw. 37 is a lock-nut adapted to be screwed onto the other end of the nut 33, so as to lock the shell 34 in position on the nut. By this means the relative positions of the revolving screw and traveling nut can be very nicely and accurately adjusted, so as to regulate with nicety the travel of the saw-frame.

The mechanism for revolving the screws is constructed as follows, (see Fig. 3:) 38 is the main driving-shaft for the saw-frames. As already explained, this is provided with a beveled gear 31, which meshes with the beveled gear 30, connected with one of the revolving screws. This driving-shaft is provided at one end with miter-gear 39, which meshes with similar gear 40 on the shaft 41, which is provided at its other end with a miter-gear 42, meshing with a miter-gear 43 on the shaft 44. This shaft 44 carries bevel-gear 31, which meshes with the beveled gear 30 on the revolving screw of the other saw-frame. The screws of both saw-frames are thus driven from the single or common driving-shaft 38. The screws and connecting-gears are so arranged that the traveling nuts are caused to move down upon their screws at the same time or to move up upon their screws at the same time, thereby causing the two saw-frames to revolve in opposite directions at the same time.

Motion is imparted to the saw-frame shaft 38 from a second shaft—to wit, the main driving-shaft 45 of the machine—by means of a clutching device or mechanism adapted to connect or disconnect the two shafts. Suitable devices are employed for automatically connecting the two shafts when a sufficient length of material has been cut to form the butt portions of the whips or other articles, so that the saw-frames will then be put into motion, so as to cut the tapering portions of the strips. Suitable devices are also employed for automatically disconnecting the two shafts, thereby stopping the revolution of the saw-frames when the saws of these two frames have again come into line, so that the saws will then cut the other butt portions to be used in forming the second whip or article. Suitable devices are also employed for again connecting the two shafts up in such a way as to cause shaft 38 to revolve in the opposite direction, thereby starting the saw-frames at the proper time, when another stalk or piece of material is introduced into the machine, but in an opposite direction, so as to cause the saw-frames while cutting the second stalk to have exactly the reverse motion and to move back to their original position. Thus the saw-frames are caused to move first in one direction and then back again in the other direction. These automatic controlling devices are constructed as follows: At the rear of the machine a pivoted arm or lever 46 is so arranged that its end lies in the path of the material which is being cut in the machine, so that as the stalk or material passes through the machine it strikes against and trips the end of this arm and moves the arm upon the pivot. (See Figs. 1, 2, and 4.) We prefer to pivot this arm upon the shaft of one of the rear feed-wheels, as shown in Fig. 2, so as to turn loosely on that shaft. The other end of this arm is connected with one end of the rod 47. The other end of this rod is connected with a crank-arm 48, attached to the rock-shaft 49. We prefer to provide the crank-arm 48 with a slot, as shown in Fig. 2, and to connect it with the rod 47 by means of a pin, whereby the throw of the arm 48 can be regulated. The rock-shaft 49 passes down through the top plate of the machine and is adapted to turn in suitable bearings therein and in the bracket 50, projecting from one of the uprights of the frame. At its lower end this rock-shaft has a second crank-arm 51, which is connected with one end of the rod 52. The rod 52 is connected at its other end with the crank-arm 53, fastened to the rock-shaft 54, which passes up through the bottom of the box containing the clutching device and is made to turn in suitable bearings therein and which carries at its upper end the pawl 55. (See Fig. 11.)

56 (see Fig. 4) is a spring fastened at one end to the frame and at the other end to the crank-arm 53 and which tends to draw the crank-arm back, and thus throw the end of the pivoted arm 46 back into the path of the material passing through the machine.

57 (see Fig. 11) is a dog in the form of a sliding plate sliding in suitable ways or guides connected with the bottom of the box containing the clutching device. This dog is provided with a projecting lug 58, against which pawl 55 is adapted to strike, so as to withdraw the dog from engagement with the upper sliding plate. This pawl is provided with a tongue or bearing-piece 59, which is pivot_u at 60 to the end of the pawl and which is adapted to strike against the lug 58.

61 is a stop-pin fastened to the pawl, against which the inner end of the tongue strikes and which limits the motion of the tongue in that direction.

62 is a flat spring fastened at one end to the pawl, as shown in Fig. 11, and passing around the end of the pawl and at its free end bearing against the other side of the tongue 59. When the pawl is turned so as to make the tongue strike the lug 58, the dog 57 is forced outward until the outer corner of the tongue slips past the beveled surface of the lug. The dog 58 is then drawn back toward its former position by the coiled spring 63, one end of which is fastened to the dog and the other end to the supporting-frame. When the pawl 55 is swung in the opposite direction, the edge or corner of the tongue 59 strikes the lug 58, and as the tongue 59 is allowed to turn on its pivot by the yielding pressure of the spring 62 the tongue 59 is forced past the lug 58 into its original position, where it is ready to again be forced against the lug 58 and withdraw the dog 57 from engagement with the upper sliding plate of the clutching device, as hereinafter explained. The bottom of the box containing the clutching device is provided with a suitable recess 64, Figs. 11, 12, and 13. 65 is a plate adapted to slide in this recess. The box is also provided underneath this plate with a slot 66, (see Fig. 13,) and below the box is another plate 67, with a projecting portion or lug 68 on its upper side adapted to move back and forth in the slot 66. The plates 65 and 67 are fastened together by bolts or in any other suitable way, as shown. To the plate 67 is fastened a connecting-rod 69 by means of a universal joint. The plate 67, and by means of it the sliding plate 65, is reciprocated back and forth by means of the connecting-rod 69, which in turn is connected with the automatic devices for stopping the motion of the saw-frames, as will be hereinafter explained.

70 is a sliding plate carrying a clutch, which is adapted to connect or disconnect the two shafts 38 and 45. This sliding plate is adapted to slide in ways or grooves formed by the plates 71 and, as shown, moves upon the upper surface of the sliding plate 65.

The two sliding plates 70 and 65 are connected together by a spring connection.

72, Figs. 11 and 12, is a rock-shaft turning in bearings in the supporting-box. 73 is a crank-arm connected with the lower end of this shaft and fastened at its outer end by a pin-and-slot connection to the plate 67, and thereby to the sliding plate 65.

74 is a flat spring which may be made of several sections or blades and which is fastened at one end to the upper end of the rock-shaft 72 and at the other end projects into a recess formed in the head of a pin 75, which is screwed into the upper sliding plate 70. When the plate 65 is moved in one direction, the crank-arm 73 is turned so as to revolve the rock-shaft 72, and thereby throw the spring 74 in the same direction. This tends to make the sliding plate 70 move with the plate 65. The movement of the plate 70 is, however, partially controlled by the pawls 76 and 77, which are pivoted to one of the plates 71 and are adapted to engage in recesses 78 78 formed in the upper sliding plate 70. These pawls are moved in one direction by the springs 79, bearing against the outer surface of the pawl, and are moved in the other direction by the inner arms 80 and 81 of the pawls. The lower sliding plate 65 is provided with projections or lugs 82 83, which are adapted to strike against the arms 80 and 81 of the pawls, so as to withdraw the pawls from the recesses 78 in the upper plate 70. These projections or lugs are provided with screws, as shown, the ends of which are adapted to strike against the arms 80 and 81. By means of these screws the operation of the device can be properly adjusted, so that the pawls will be withdrawn from the plate 70 at the proper time.

When the upper plate 70 is moved to its extreme position in one direction, the pawl at that end engages with the recess 78 at that end of the plate and holds it in that position. When the lower plate 65 is thrown in the other direction, the spring 74 is turned or bent in that direction and tends to throw the upper plate 70 in the same direction; but the upper plate is held in position by its retained pawl. When, however, the lower plate 65 has moved so far in the direction referred to that the pin in the projecting lug 82 or 83 strikes against the inner arm of the pawl, the pawl is disengaged from the plate 70, and the spring 74 operates to throw the upper plate 70 in the same direction.

The plate 70 is provided on one side with the recess 84, into which the dog 57 is adapted to be forced by the operation of the spring 63. When the spring 74 throws the upper plate 70 in one direction or the other in the way already described, the moment the plate 70 reaches its middle position the dog 57 is forced into the slot 84 and holds the plate 70 in this position until the dog 57 is withdrawn by the operation of the pawl 55, as already explained, when the spring 74 again moves the upper plate 70 to its end position.

When the upper plate 70 is held in its middle position by the dog 57, the shafts 38 and 45 are disconnected. When the upper plate 70 is in a position at either end of its throw, the two shafts are connected together by means which we will now explain.

Referring to Figs. 12 and 13, 85 is a clutching-sleeve keyed to the shaft 45, but adapted to slide in either direction on said shaft. 86 86 are arms rising from the plate 70 and forming a yoke, to the upper end of which is attached the collar or ring 87, which extends into an annular groove in the clutching-sleeve 85. As a result of this construction the sleeve 85 necessarily moves with the sliding plate 70. 88 89 are sleeves adapted to revolve loosely on the driving-shaft 45 when the clutching-sleeve 85 is in its middle position and adapted to be connected alternately with the shaft 45, so as to revolve therewith when the clutching-sleeve 85 is moved in one direction or the other. These sleeves are provided with the pulleys 90 and 91, respectively, which are recessed on their inner faces and each of which is provided with any suitable form of clutch to be operated by the clutch-sleeve 85, whereby it can be connected with the shaft 45.

The particular form of clutching mechanism can be greatly varied. We have shown one form in Fig. 12. It consists of the split ring 92, provided with the wedging-piece 93, which is adapted to be drawn down by the two pivoted levers 94 94. These levers have projecting pieces 95 at their lower ends, (see Fig. 13,) which are adapted to be forced apart by the beveled surface of the clutch-sleeve 85. When the clutch-sleeve is moved toward one of the sleeves 88 or 89, it forces apart the lower ends of the pivoted levers 94, and thereby draws down the wedging-piece 93 and expands the split ring 92, so as to force it tightly against the pulley 90 or 91. As the parts of the clutching mechanism—that is to say, the split ring and the other parts mentioned—revolve with the shaft 45 the pulley and its sleeve are thereby made to revolve with the shaft 45.

The sleeve 88, Fig. 13, is provided with the cone-gear 96, and the sleeve 89 is provided with a similar cone-gear 97. The purpose of having the cone-gear is to make it possible to revolve the shaft 38, and thereby the saw-frames, at different rates of speed and in this way to vary the lengths of the tapered strips in which the material is cut. The shaft 38 is provided with two sleeves 98 and 99, which are keyed to the shaft, so as to revolve therewith, but are capable of being moved in either direction along the shaft. The sleeve 98 has a gear-wheel 100, adapted to revolve with the sleeve. The sleeve 99 has a similar gear-wheel 101. The gear-wheel 100 is connected with any desired portion of the cone-gear 96 by means of intermediate gears carried by the arm 102. The gear-wheel 101 is connected with any desired portion of the cone-gear 97 by means of intermediate gears carried by a similar arm 103. The arms 102 and 103 are pivoted, so as to turn on the sleeves 98 and 99, as shown in Fig. 11. The arm 102 carries a gear-wheel 104, which can be made to mesh with any part of the cone-gear 96 by turning the arm 102 on its pivot, so as to lift it away from the cone-gear 96, and then moving the sleeve 98 on the shaft 38 until the gear-wheel 104 is brought into proper position. The gear 104 is attached to a counter-shaft which revolves in a bearing in the arm 102 and which has a smaller gear 105 attached to its other end on the opposite side of the arm. The gear 105 meshes with the idler 106, which in turn meshes with the gear 107, which meshes with the gear 100. It will be seen that motion can be imparted in this way from the main driving-shaft 45 to the driving-shaft 38. The other end of the arm 102 is supported in the proper position by being clamped to the slotted arm 108. A headed bolt 109 passes through the slot in the arm 108 and through a hole in the end of the arm 102. The bolt is adapted to slide in the slot of the arm 108. When the arm 102 has been brought to the desired position, the nut 110 is screwed fast, and the arm 102 is thereby clamped in that position. The arm 108 is carried by the plate 111, which is adapted to slide in a dovetailed groove formed by the pieces 112, which are bolted or otherwise fastened to the side of the box, as shown in Fig. 12. The arm 108 can thus be moved lengthwise of the box with the arm 102. The arm 108 is provided on its inner face with a rack 113, and the arm 102 carries a pawl 114, (see Fig. 12,) adapted to engage with the teeth of the rack. This pawl is pressed against the rack by a suitable spring 115.

The rack and pawl are designed to assist in holding arm 102 in place and to prevent the outer end of this arm from being loosened from its position by the jarring of the machine.

The arm 103 is provided with intermediate gears arranged in exactly the same manner, except that the idler 106 is omitted and the gear 105 made to mesh directly with the gear 107. This can easily be accomplished by lowering slightly the bearing of the gear 107.

As a result of introducing the idler 106 in the intermediate gear of one arm and omitting it on the other arm it follows that when the sleeve 88 is clutched to the shaft 45 the shaft 38 is made to revolve in one direction; but when the sleeve 89 is clutched to the shaft 45 the shaft 38 is made to revolve in the other or opposite direction.

The mechanism for automatically operating the sliding plate 65, and thereby disconnecting the two shafts and stopping the revolution of the saw-frames at the proper time, is constructed as follows: One of the revolving screws 27 for operating the saw-frame, Figs, 1, 8, 9, and 10, is provided at both ends with the sleeves 116 and 117, encircling the screw 27 and adapted to slide thereon. The construction of these sleeves is clearly shown in Figs. 8 and 9. The sleeve is provided at its inner end with an exterior screw-thread. 118 is a nut which is adapted to be screwed upon the inner end of the sleeve, and 119 is a lock-nut to hold the nut 118 in place. When the traveling nut 32 has about reached the proper limit of its travel, it strikes against the nut 118 on the end of the sleeve 116 or 117, as the case may be, and moves the sleeve on the screw toward the end thereof. The sleeve 116 is connected with the lever 120, which is pivoted to the frame 28. The outer end of this lever is pivoted to the connecting-rod 121. This connecting-rod 121 at its lower end is also connected with the sleeve 117 by means of the lever 122, which is also pivoted to the frame 28, and the inner end of which is pivoted to the sleeve 117, as shown in Fig. 9. 123 is a connecting-rod pivoted at one end to the rod 121 and connected at its other end, preferably by pin-and-slot connection, with one arm of the bell-crank lever 124. This bell-crank lever is pivoted at the juncture of its two arms to the bracket 125, which is fastened to the frame of the machine. (See Figs. 3, 9, and 10.) The other arm of the bell-crank lever is connected by a universal joint 126 with the connecting-rod 69. The other end of this rod is connected by a universal joint 127 with the plate 67, which, as already explained, is attached to the lower sliding plate 65. When the nut 32 strikes the sleeve 116, it moves that sleeve up on the screw 27, and by means of the intervening rods and levers draws the plate 65 toward the front of the machine—that is, to the extreme right-hand position in Figs. 11 and 13. At the same time the upper sliding plate 70 is thrown in the same direction; but when this plate reaches a middle position it is caught in that position by reason of the fact that the dog 57 is forced into the recess 84 in the plate 70. The clutching device is now disengaged from both of the sleeves 88 and 89, and consequently the shafts 45 and 38 are disconnected from each other and the saw-frames remain at rest. When the dog 57 is withdrawn from the recess in the plate 70, the plate 70 is thrown over to the extreme right-hand position in Figs. 11 and 13, thereby clutching the sleeve 88 to the shaft 45 and connecting the shafts 45 and 38 together and causing the shaft 38 to revolve in a direction opposite to the direction in which it had previously revolved, and thus causing the saw-frames to revolve again in an opposite direction, so that the nut 32 now travels down the screw 27 until it strikes the sleeve 117 at the lower end of the screw and forces this sleeve down on the screw, and thereby rocks the lever 122 on its pivot. By means of the connecting-rods and levers the sliding plate 67 is thereby thrown toward the rear of the machine—that is, into the extreme left-hand position of Figs. 11 and 13. The upper sliding plate 70 is also thrown in the same direction, but is again caught in a middle position, so that the saw-frames are again brought to rest and are not again started until the pawl 57 is withdrawn from the recess 84 in the plate 70. In this way the saw-frames are automatically brought to rest at the proper time—that is to say, when they have completed their tapering cuts and when the saws are again in position to cut the second or rear butt portions of the stalk. By turning the nut 118 on the sleeves 116 or 117 the extent of travel of the nut 32 on the screw can be accurately regulated or adjusted, and thereby the extent of revolution of the saw-frames can be nicely regulated.

It is necessary to provide means for driving the saw-wheels continuously, no matter what the position of the saw-frames may be, and during the time of revolution of the saw-frames, as well as during its time of rest.

The mechanism for driving the saw-wheels is constructed as follows, (see Figs. 1, 3, and 4:) 128 is a driving-shaft, which is mounted in suitable bearings 129 in the frame of the machine. This shaft can be driven in any suitable manner, as from a pulley at its outer end, which, however, is not shown in the drawings. 130 is a pulley fastened to the shaft 128, so as to revolve therewith. 131 is a swinging frame, which is pivoted on the shaft 128 and is preferably made in the form of a yoke, so as to have a bearing on the shaft on each side of the pulley 130. This swinging frame carries at its outer or free end a counter-shaft 132, mounted in suitable bearings in the swinging frame and having fastened to it the two pulleys 133 and 134. The pulleys 130 and 133 are connected by means of the belt 135. The shaft of the middle saw-wheel 8 of the saw-frame is extended, as shown in Fig. 4, so as to have two bearings in the saw-frame, one near the wheel and the other in a bracket or extension of the saw-frame 136. This shaft is provided with a pulley 137, fastened to the shaft between its two bearings, and this pulley 137 is connected with the pulley 134 on the counter-shaft 132 by means of the belt 138. The counter-shaft 132 and the shaft of the saw-wheel are connected by means of the link 139, which is pivoted to both shafts, the object of this link being to keep the shaft of the saw-wheel and the counter-shaft always at the same distance from each other, so that the belt 138 will be kept taut or at the proper tension. Link 139 can be made in two parts, as shown in Fig. 4, secured to each other by a slot-and-pin connection, so that the length of the link can be regulated to properly adjust the tension of the belt 138. The swinging frame 131 can also be made of two parts or plates, as shown in Fig. 3, connected together by slots and bolts, by means of which the swinging frame can be lengthened or shortened and the distance between the counter-shaft and the shaft 138 properly regulated. This same form of driving mechanism is used in connection with the wheels of each frame. By changing or adjusting the sizes of these various pulleys with reference to one another the speed of revolution of the saw-wheels can be controlled and properly adjusted.

The mechanism for feeding the stalk or material into and through the machine is shown in Figs. 2, 4, and 6. In the form illustrated in the drawings eight feed-rolls are employed, four at the front of the machine and four at the rear of the machine, as shown in Fig. 2. The four feed-rolls in the front are driven by the same mechanism as the four feed-rolls at the rear, with the single exception hereinafter mentioned. 140 140 are the feed-rolls. 141 is a sliding plate sliding in suitable ways in the frame of the machine. Each of these sliding plates is provided with two feed-rolls at its inner end, the shafts of these feed-rolls revolving in bearings in the sliding plate. The sliding plate is provided at its inner end, as shown by dotted lines in Fig. 6, with two projecting arms, furnishing bearings for the shafts of the feed-rolls. 142 is a cushion or spring made of rubber or other suitable material and fastened in any suitable way to the plate 141. At its outer end this cushion bears against one end of the pivoted arm 143. This arm is provided with a handle 144, by means of which it can be turned on the pivot. At its other end the arm is provided with means for locking it in place. (For a detailed view of which see Fig. 7.) This device consists of a pin 145, passing through a recess in the end of the arm 143 and adapted to be inserted in a hole in the frame of the machine. The pin is provided with a collar 146, moving in the recess at the end of the arm and pressed downward by a coiled spring 147. When the feed-rolls are in operative position, the arm 143 is turned so as to bring the pin 145 over the hole of the frame, when the pin is pressed into place, and the arm is thus locked in position. The cushion 142 and the arm are so arranged with reference to each other that the plate 141 is pressed inward toward the material with a yielding pressure. If for any reason it is desirable to relieve the plate 141 from the spring-pressure, this can be done by lifting pin 145 and turning the arm 143. The shaft of the outer roller 140 is provided at its lower end with a worm-wheel 148, which meshes with a worm 149 on the shaft 150 or 151, as the case may be, the shaft 150 driving the feed-rolls at the front of the machine and the shaft 151 driving the feed-rolls at the rear of the machine. The shaft 150, Fig. 3, is connected directly by miter-gears with the main driving-shaft 45 of the machine. The shaft 151 is connected with the main driving-shaft by means of the intermediate shaft 152, which is connected with the shafts 151 and the shafts 45 by spiral gears, as shown. The shaft of the outer feed-roll is also provided with a gear 153, which is connected with a corresponding gear 154 on the shaft of the inner feed-roll by means of the intermediate gear or idler 155, Fig. 6. Each pair of feed-rolls, whether at the front of the machine or at the back of the machine, are connected in a similar manner, the shafts 150 and 151 being each provided with two worms, as shown. To properly support the feed-rolls and shafts, the sliding plate 141 is provided with a depending portion 156, which carries at its lower end a housing 157, which partially incloses the gears. As a result of this construction the sliding plate 141 can be moved back and forth in its ways in the machine without disengaging the feed-rolls from their driving mechanism, the worm-wheel 148 simply riding on the worm 149 and not becoming disengaged therefrom.

The feed-rolls are pressed against the stalk or material with a yielding pressure and grip it with sufficient firmness to feed it steadily through the machine. At the same time these feed-rolls are adapted to give, so as to accommodate themselves to the variations in size of the material.

It is of great importance that the saws should be accurately guided at the point where they pass through the material and split it into the different portions. To secure this result, each saw-frame is provided with a suitable guiding device revolving with the saw-frame. The construction of these guides is shown in Figs. 15 and 18 to 24.

The guide for the rear saw-frame is shown in Figs 18, 19, and 20. It consists of a supporting-plate 158. This support is provided with four sets of guide-plates, two sets for each saw, one set being on one side of the path of the material and the other set being on the other side of the path of the material, so that the saw is held in place or guided on both sides of the line or place of cutting The guiding device for each saw is therefore composed of two parts, one on each side of the path of the material. Each set of guide-plates is constructed in the same manner. 159 159 are side guide-plates placed on opposite sides of the saw and adapted to guide it in the proper path. 160 are set-screws passing through the wall of the support and bearing at their inner ends against the edges of the guide-plates 159. By means of these screws the side guide-plates can be moved in toward the saw and can be held in any desired position, so that the saw cannot force them apart. 161 161 are back guide-plates which are adjustable transversely of the direction of motion of the saw. The back guide-plates pass underneath or back of the side guide-plates 159. The back guide-plates slide on suitable ways in the supporting-plate. This back guide-plate prevents the saw from being forced backward by the friction or pressure which the material exerts upon the saw during the cutting. As the saw will be forced against this back guide-plate the surface of the plate will be worn away gradually by the friction. When a certain portion of the plate has been worn in this manner, the plate can be moved a little in one direction or the other until a fresh bearing-surface is brought opposite the saw. 162 162 are clamping-plates to hold the guide-plates in place. The back guide-plate is first adjusted, then the side guide-plates are brought into proper position, then the clamping-plates are screwed into place and clamp the side guides in position, and the side guides bear against and clamp the back guides. It will be seen that as a result of this construction each saw is guided and supported for some distance on each side of the line or place of cutting, and the various guide-plates can be easily and accurately adjusted. The guiding device is mounted on a bearing plate or ring 163, Figs. 4 and 6, which is supported at the inner end of a hollow stud 164, which is screwed into the bearing-plate 4. The shape of the bearing-plate 163 is clearly shown in Fig. 14. This bearing-plate is provided with undercut projections 165, which are of sufficient length to prevent the guiding device from falling out of place during the revolution of the saw-frame. These undercut projections 165 extend for only a part of the distance around the periphery of the plate 163. The inner or under surface of the support-plate 158 of the guide is provided with a recess 166, Figs. 15 and 20. Around the edges of this recess there are undercut projections 167, similar to the projection 165. The guiding device is inserted in place by passing the projections 167 through the openings between the projections 165 and then turning the saw-guide on the bearing-plate 163 until the recess 168 in the guiding device is brought opposite the bolt 169. This bolt is fastened to the saw-frame and adapted to slide in a suitable slot or passage, as shown in Fig. 14. The bolt is operated by means of the pivoted arm 170, which is provided with a pin 171, moving in a slot 172 in the bolt. When the guiding device is put in proper position, it is locked to the saw-frame by moving the bolt into the recess 168. By means of this construction the guiding device is made to revolve with the saw-frame. At the same time it is mounted on an independent fixed bearing in the machine, so as to have no sidewise motion. In some cases the saw-frame might have a slight amount of play, which would tend to throw the saws out of line; but by mounting the saw-guide on an independent bearing in the manner described the saws are guided accurately through the material.

In Fig. 1 two arms 173 are shown projecting down from the frame of the machine and carrying at their lower ends suitable guiding-plates to guide and support the saws at that point.

The guiding device for the front saw-frame is shown in Figs. 21 to 24. The construction of this device is substantially the same as that of the guiding device for the rear saw-frame, already described, except that the parts are in a reverse position with reference to their supporting-plate. 174 is the supporting-plate. This is mounted on the bearing-plate 163 at the center of the front saw-frame in the manner already explained and is locked by a bolt to its saw-frame, as illustrated in Figs. 14 and 15. 175 175 are the side guide-plates, which can be adjusted by the screws 176 176, which in this case pass through the plates 177 177. 178 178 are clamping-plates which bear against the guide-plates 175 and hold them in place. 179 179 are the back guide-plates, adjustable transversely of the path of motion of the saws. These plates 179 are held in grooves in the carrying-plate 180. 181 181 are screws adapted to fasten the clamping-plates, and thereby the guide-plates, to the carrying-plate, as shown in Figs. 22 and 23. The carrying-plate slides on ways in the supporting-plate 179 and is held in place on that plate by the cam-lock 182, having the handle 183, by which it can be turned. The cam when turned into a locking position projects into a groove in the plate 180, as shown. There are four sets of guide-plates, as in the other guiding device, so that each saw is properly guided on each side of the place of cutting. Fig. 24 shows the plate 180 removed from the supporting-plate 174 and turned bottom side up.

It is of great importance that the material while passing through the machine should be properly guided or centered, so that the center line of the material should always be coincident with the axis of the machine at the place of cutting in order that each saw may pass through the center of the material and split it into strips of equal size. If the material were of regular and uniform size, this could be accomplished by having fixed guides of the exact size to fit the material; but ratan or other material of this kind is not uniform in shape or size, different parts of the same stalk often varying in diameter and shape. In our complete machine the material is automatically centered, notwithstanding its irregularties and variations, by centering-chucks. (Shown in Figs. 25 and 31.) Each chuck has an outer supporting-tube 184, which is provided with ways or tracks 185, upon which slide the clamping-jaws 186. These jaws are provided with grooves 187, into which the ways or tracks 185 project. These ways diverge toward the rear of the machine, so that as the jaws are moved or forced toward the rear the jaws are at the same time opened out or separated, thereby enlarging the aperture or passage between the bearing-faces of the jaws. 188 is an inner tube adapted to move back and forward in a suitable bearing 189 in the outer tube. The purpose of this inner tube is to cause the jaws to move simultaneously—that is to say, with one another—either toward or away from the material, and also to provide means for normally pressing the jaws against the material, so as to make the jaws clamp the material and hold it properly in place. The inner tube is provided with slots 190, into which the jaws fit nicely, so that the jaws will move longitudinally with the tube. At the same time the jaws have the capacity of moving in and out toward or from the center of the tube. 191 is a coiled spring bearing at one end against a collar or shoulder on the outer tube and at the other end against a collar or shoulder on the inner tube and tending always to force the inner tube forward, and thereby to press the jaws to their innermost position. Both the inner and outer tubes are provided with slots 192, which are in line with each other, through which the band-saws pass when the chucks are in place in the machine. These chucks are inserted in studs 164. (See Figs. 2, 4, and 6.) When in position in the machine, they occupy the relative position shown in Figs. 25 and 26, Fig. 25 representing the chuck at the center of the front saw-frame, and Fig. 26 the chuck at the center of the rear saw-frame. The front chuck is inserted from the front of the machine and the rear chuck is inserted from the rear of the machine, and they are then locked and held in place by the pivoted plate 193. (See Figs. 1, 2, 4, 5, and 6.) When in position, the jaws of the two chucks come close together, as shown in Fig. 2 and as represented in Figs. 25 and 26, the jaws of the front chuck being put at the rear end of that chuck and the jaws of the rear chuck being put to the front of that chuck. The chucks are made to revolve with the saw-frames by means of the pins 194 on the saw-guides, which project into one of the slots 192 in the outer tube of each chuck. (See Figs. 18 and 21.) The material is fed into these chucks from left to right, as shown in Figs. 27 and 28. When the end of the material strikes the front end of the jaws, the jaws are forced backward and outward until the jaws are opened to permit the material to pass through them. The jaws and the inner tube are necessarily moved together longitudinally, and for this reason the jaws necessarily move together. Hence each jaw moves outward or inward to the same extent, and the material is therefore always held in a central position. The springs which press the inner tubes forward always force the jaws firmly against the material. No matter how much the material may vary in size or shape the jaws will always accommodate themselves to the variations and will keep the material in the center. Consequently the material will be split or sawed through its axis for its entire length and will be divided into equal strips or portions. Power may be imparted to the main driving-pulley 195. (See Fig. 2.)

The operation of our machine is as follows: The different parts of the machine having been properly assembled and adjusted, one end of the stalk or material is introduced between the front pair of feed-rolls and is caught by these rolls and fed into and through the forward centering-chuck. (Shown in Fig. 25.) It is accurately clamped in a central position by the jaws of the chuck and then comes into contact with the saws of the front saw-frame. These saws being, for example, in the position shown in full lines in Fig. 5 cut the stalk into four equal parts, one saw cutting it vertically through the center and the other saw cutting it horizontally through the center. The stalk is fed forward until its end strikes the jaws of the centering-chuck of the rear saw-frame, which centers it in the way already described, and it then comes into contact with the two saws of the rear frame, which being exactly in line with the saws of the front frame pass through the cuts in the material already made by the front saws. The material passes forward through the machine until its end strikes the end of the pivoted arm 46 and trips that arm, and thereby operates the clutching device in the manner already explained and connects the main driving-shaft with the driving-shaft of the saw-frames. The saw-frames are now made to revolve one in one direction and the other in the other direction and the saws cut the material on diagonal lines, thereby forming tapered strips or portions. The saw-frames continue to revolve until the saws of one frame again come into line with the saws of the other frame, when the revolution of the saw-frames is stopped by means of the traveling nut 32, which strikes against the sleeve 117, and thereby moves the lower sliding plate 65 of the clutching mechanism, which moves the upper sliding plate 70 to a middle position, where it is caught and held by the dog 57, thus disconnecting the saw-frame shaft from the main driving-shaft of the machine. From this time on the stalk is cut into four strips or portions, just as it was at the beginning. The stalk is thus cut into eight equal parts, each of these parts having a butt portion equal to one-fourth of the original stalk and a tapering portion tapering gradually and uniformly from the butt portion to the tip.

Figs. 32 and 33 show diagrammatically the manner in which the stalk is cut. Fig. 32 is a side view of the stalk, showing the lines of cleavage. Fig. 33 contains a series of cross-sections of the stalk, showing the lines of cleavage at twelve different points along the length of the stalk. The first two sections at the left hand show the lines of cleavage while the butt portions are being cut and the saws are in line with one another. In the third section the saws previously in line are beginning to diverge, making four separate lines of cleavage. In the fourth section the lines of cleavage diverge still more, and so on until in the section next to the last the saws have again come in line and are cutting the butt portions at the rear end of the stalk. When another stalk is fed into the machine, the same operation is repeated, except that after the butt portions at the front end of the stalk have been cut and the arm 46 tripped in the manner already described the saw-frames are revolved in the opposite direction and tapering cuts are made in the stalk until the saws of the two frames again come into line in the position shown in full lines in Fig. 5, when the revolution of the saw-frames is stopped by means of the traveling nut 32, which strikes against the sleeve 116, and thereby moves the lower sliding plate 65 of the clutching mechanism in an opposite direction to the other end of its stroke, which moves the upper sliding plate 70 back to a middle position, where it is again caught and held by the dog 57, thus disconnecting the saw-frame shaft from the main driving-shaft of the machine.

Many advantages, as we believe, are secured by our machine over devices previously known in the art. Some of these advantages have already been fully explained.

The tapering strips into which the stalk is split are ready to be trimmed and prepared, so that they can be united into complete whips. We have invented a second machine for doing this work, which is described and claimed in another application, although these tapering strips may be prepared for being united by any well-known means.

One advantage resulting from this invention is the preservation of the entire enamel or skin of the stalk. In many devices for making whips and similar articles a portion of the enamel or skin of the material is cut off and wasted, which is a serious loss, as it is of great importance in order to secure strength and flexibility to preserve the enamel intact.

Another advantage is that the strips are straight or, to put it in another way, are tapering equally on both sides, so that along their center line the fiber of their material is uncut and runs from the butt-end to the tip end. This not only strengthens the strips, and thereby the articles produced from them, but it also makes the whip or other article formed by uniting four of these strips straight from end to end. The tip of the whip has no tendency to bend in one direction or the other.

Having fully described our invention, what we claim as new, and desire to secure by Letters Patent, is—

1. In a machine for splitting ratan, wood or other material, the combination of a plurality of cutter-frames adapted to revolve in opposite directions around the path of the material, dividing-cutters carried by said frames, and mechanism for operating the frames.

2. In a machine for splitting ratan, wood or other material, the combination of a plurality of cutter-frames adapted to revolve in opposite directions around the path of the material, dividing-cutters carried by said frames, mechanism for operating the frames and mechanism for feeding the material to the cutters.

3. In a machine for splitting ratan, wood or other material, the combination of a plurality of saw-frames adapted to revolve in opposite directions around the center line of the path of the material, saws carried by said frames, mechanism for operating the frames, and mechanism for operating the saws.

4. In a machine for splitting ratan, wood, or other material, the combination of a plurality of saw-frames adapted to revolve in opposite directions around the center line of the path of the material, saws carried by said frames, mechanism for operating the frames, mechanism for operating the saws, and mechanism for feeding the material to the saws.

5. In a machine for splitting ratan, wood or other material, the combination of a plurality of cutter-frames adapted to revolve in opposite directions around the path of the material, dividing-cutters carried by said frames, cutter-guides revolving with the cutter-frames, and mechanism for operating the frames.

6. In a machine for splitting ratan, wood or other material, the combination of a plurality of cutter-frames adapted to revolve in opposite directions around the path of the material, dividing-cutters carried by said frames, cutter-guides revolving with the cutter-frames, mechanism for operating the frames, and mechanism for feeding the material to the cutters.

7. In a machine for splitting ratan, wood, or other material, the combination of a plurality of saw-frames adapted to revolve in opposite directions around the center line of the path of the material, saws carried by said frames, saw-guides revolving with the saw-frames, mechanism for operating the frames, and mechanism for operating the saws.

8. In a machine for splitting ratan, wood, or other material, the combination of a plurality of saw-frames adapted to revolve in opposite directions around the center line of the path of the material, saws carried by said frames, saw-guides revolving with the saw-frames, mechanism for operating the frames, mechanism for operating the saws, and mechanism for feeding the material to the saws.

9. In a machine for splitting ratan, wood or other material, the combination of a plurality of saw-frames adapted to revolve in opposite directions around the center line of the path of the material, saw-wheels journaled in bearings in the saw-frames, band-saws carried by the wheels, mechanism for operating the frames, and mechanism for revolving the saw-wheels.

10. In a machine for splitting ratan, wood, or other material, the combination of a plurality of saw-frames adapted to revolve in opposite directions around the center line of the path of the material, saw-wheels journaled in bearings in the saw-frames, band-saws carried by the wheels, mechanism for operating the frames, and mechanism for revolving the saw-wheels, and mechanism for feeding the material to the saws.

11. In a machine for splitting ratan, wood, or other material, the combination, substantially as set forth, of a plurality of saw-frames adapted to revolve in opposite directions around the center line of the path of the material, saw-wheels journaled in bearings in the saw-frames, band-saws carried by the wheels, saw-guides revolving with the saw-frames and adapted to make the saws pass through the axis of the material, mechanism for operating the frames, and mechanism for revolving the saw-wheels.

12. In a machine for splitting ratan, wood, or other material, the combination, substantially as set forth, of a plurality of saw-frames adapted to revolve in opposite directions around the center line of the path of the material, saw-wheels journaled in bearings in the saw-frames, band-saws carried by the wheels, saw-guides revolving with the saw-frames and adapted to make the saws pass through the axis of the material, mechanism for operating the frames, mechanism for revolving the saw-wheels, and mechanism for feeding the material to the saws.

13. In a machine for splitting ratan, wood, or other material, the combination, substantially as set forth, of a plurality of saw-frames adapted to revolve in opposite directions around the center line of the path of the material, saw-wheels journaled in bearings in the saw-frames, band-saws carried by the wheels, saw-guides revolving with the saw-frames but mounted on independent fixed bearing attached to the frame of the machine so as not to partake of any lateral movement of the saw-frames and adapted to make the saws pass through the axis of the material, mechanism for operating the frames, mechanism for revolving the saw-wheels, and mechanism for feeding the material to the saws.

14. In a machine for splitting ratan, wood or other material, the combination, substantially as set forth, of two saw-frames adapted to revolve in opposite directions around the center line of the path of the material, saw-wheels journaled in bearings in the saw-frames, some of said bearings being adjustable toward or away from the bearings of the adjacent wheel whereby the tension on the saws can be regulated, band-saws carried by the wheels, saw-guides revolving with the saw-frames, mechanism for operating the saw-frames and mechanism for revolving the saw-wheels.

15. In a machine for splitting ratan, wood or other material, the combination, substantially as set forth, of two saw-frames adapted to revolve in opposite directions around the center line of the path of the material, saw-wheels journaled in bearings in the saw-frames, some of said bearings being pivoted whereby the saw-wheel shaft held in said bearings can be tilted, band-saws carried by the wheels, saw-guides revolving with the saw-frames, mechanism for operating the saw-frames and mechanism for revolving the saw-wheels.

16. In a machine for splitting ratan, wood or other material, the combination, substantially as set forth, of two saw-frames adapted to revolve in opposite directions around the center line of the path of the material, saw-wheels journaled in bearings in the saw-frames, some of said bearings being pivoted and adjustable whereby the saw-wheel shaft held in said bearings can be tilted and the tension on the saws can be regulated, band-saws carried by the wheels, saw-guides revolving with the saw-frames, mechanism for operating the saw-frames and mechanism for revolving the saw-wheels.

17. In a machine for splitting ratan, wood or other material, the combination, substantially as set forth, of two saw-frames adapted to revolve in opposite directions for at least an eighth of a circle around the center line of the path of the material, saw-wheels journaled in bearings in the saw-frames, two band-saws on each saw-frame carried by the wheels and crossing each other at right angles at the point of cutting, mechanism for operating the saw-frames and mechanism for revolving the saw-wheels whereby the material can be split into eight equally-tapering parts.

18. In a machine for splitting ratan, wood or other material, the combination, substantially as set forth, of the saw-frames 6, 6, adapted to revolve in opposite directions, the saw-wheels 7, 8, 9, the band-saws 10, 11, the pivoted bearings 18, 18, the adjustable yokes 21, 21, and mechanism for operating the saw-frames, and mechanism for revolving the saw-wheels.

19. In a machine for splitting ratan, wood, or other material, the combination, substantially as set forth, of a saw-frame adapted to revolve around the center line of the path of the material while the material is being split, three or more saw-wheels journaled in bearings in the saw-frame, a plurality of band-saws carried by the wheels, saw-guides revolving with the saw-frame and adapted to guide and hold the band-saws in proper relation to each other, mechanism for operating the frame while the material is being split and mechanism for revolving the saw-wheels.

20. In a machine for splitting ratan, wood or other material, the combination, substantially as set forth, of a saw-frame adapted to revolve around the center line of the path of the material while the material is being split, saw-wheels journaled in bearings in the saw-frame, band-saws carried by the wheels, a revolving screw journaled in a suitable frame, a nut traveling on said screw and connected with the saw-frame whereby the saw-frame is revolved while the material is being split, and means for revolving the screw and mechanism for revolving the saw-wheels.

21. In a machine for splitting ratan, wood or other material, the combination, substantially as set forth, of a saw-frame adapted to revolve around the center line of the path of the material, saw-wheels journaled in bearings in the saw-frame, band-saws carried by the wheels, a revolving screw journaled in a suitable frame, a nut traveling on said screw and connected with the saw-frame, a sliding sleeve on the screw against which the nut is adapted to strike, means for revolving the screw, and connecting mechanism between the sliding sleeve and the means for revolving the screw whereby the movement of the sleeve on the screw stops the revolution of the screw, and mechanism for revolving the saw-wheels.

22. In a machine for splitting ratan, wood or other material, the combination, substantially as set forth, of a saw-frame adapted to revolve around the center line of the path of the material, saw-wheels journaled in bearings in the saw-frame, band-saws carried by the wheels, a revolving screw journaled in a suitable frame, a nut traveling on said screw and connected with the saw-frame, sliding sleeves on the screw against which the nut is adapted to strike, a driving-shaft with which the screw is connected, a second driving-shaft, a clutch adapted to connect or disconnect the two shafts, and mechanism connecting the sliding sleeves and the clutch whereby the movement of the sleeves on the screw stops the revolution of the screw, and mechanism for revolving the saw-wheels.

23. In a machine for splitting ratan, wood, or other material, the combination, substantially as set forth, of a saw-frame adapted to revolve around the center line of the path of the material, saw-wheels journaled in bearings in the saw-frame, band-saws carried by the wheels, the revolving screw 27, the pivoted frame 28 in which the screw is journaled, the shaft 38 connected with the screw by suitable gearing, the traveling nut 32, the sliding sleeves 116, 117, the levers 120, 122 pivoted to the frame, the connecting-rods 121, 123, the bell-crank lever 124, the connecting-rod 69, the sliding plate 65, the driving-shaft 45, and a clutch adapted to connect or disconnect the shafts 38 and 45, and operated by the sliding plate 65, and mechanism for revolving the saw-wheels.

24. In a machine for splitting ratan, wood, or other material, the combination, substantially as set forth, of two cutter-frames adapted to revolve in opposite directions around the center line of the path of the material, cutters carried by said frames, mechanism for operating the cutters, means for revolving the cutter-frames in opposite directions at the same time and at the same speed, and means for starting said frames simultaneously and means for stopping them simultaneously.

25. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, revolving screws, one for each saw-frame, journaled in a suitable frame, nuts traveling on said screws and connected with the saw-frames, a common driving-shaft so connected with both of said screws as to revolve the saw-frames in opposite directions at the same time, and means for automatically stopping the revolution of the saw-frames when the saws of one frame come in line with the saws of the other frame.

26. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, revolving screws, one for each saw-frame, journaled in a suitable frame, nuts traveling on said screws and connected with the saw-frames, a common driving-shaft so connected with both of said screws as to revolve the saw-frames in opposite directions at the same time, sliding sleeves on one of the screws against which the nut on that screw is adapted to strike, a second driving-shaft, a clutch adapted to connect or disconnect the two shafts, and mechanism connecting the sliding sleeves and the clutch whereby the movement of the sleeves on the screw stops the revolution of the common shaft connected with the screws, and thereby the saw-frames.

27. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, revolving screws 27, pivoted frames 28 in which the screws are journaled, the common shaft 38 connected with the screws by suitable shafts and gearing, the traveling nuts 32, the sliding sleeves 116, 117, the levers 120, 122 pivoted to one of the frames, the connecting-rods 121, 123, the bell-crank lever 124, the connecting-rod 69, the sliding plate 65, the driving-shaft 45, and the clutch adapted to connect or disconnect the shafts 38 and 45, and operated by the sliding plate.

28. In a machine for splitting ratan, wood, or other material, the combination, substantially as set forth, of two saw-frames adapted to revolve in opposite directions around the center of the path of the material, saw-wheels journaled in bearings in the saw-frames, band-saws carried by the wheels, means for revolving the saw-frames in opposite directions, a pulley on the shaft of one of the saw-wheels, a driving-shaft for the saw-wheels, a pulley on said driving-shaft, a swinging frame pivoted on the driving-shaft, a counter-shaft carried by the swinging frame, a pivoted link connecting the outer end of the swinging frame with the saw-wheel shaft and intermediate pulleys on the counter-shaft.

29. In a machine for splitting ratan, wood, or other material, the combination, substantially as set forth, of two saw-frames adapted to revolve in opposite directions around the center of the path of the material, saw-wheels journaled in bearings in the saw-frames, band-saws carried by the wheels, means for revolving the saw-frames in opposite directions, a driving-shaft for the saw-wheels, a swinging frame pivoted on the driving-shaft, a counter-shaft carried by the swinging frame, a link pivoted at one end to the shaft of one of the saw-wheels and at the other end to the counter-shaft and means for imparting motion from the driving-shaft to the counter-shaft and from the counter-shaft to the saw-wheel shaft.

30. In a machine for splitting ratan, wood, or other material, the combination, substantially as set forth, of two saw-frames adapted to revolve in opposite directions around the center of the path of the material, the saw-wheels 7, 8, 9, three journaled in each frame, the middle saw-wheel being provided with two flanges so as to carry two saws, the band-saws 10, 11, the driving-shaft 128, the pulleys 130, the swinging frames 131, the counter-shafts 132, the pulleys 133, 134, the belts 135, the belts 138, and the pulleys 137 on the saw-wheel shafts, and means for revolving the saw-frames in opposite directions.

31. In a machine for splitting ratan, wood, or other material, the combination with one or more saws of a centering-chuck, consisting of a supporting-tube provided with inclined ways, diverging toward the rear of the machine, clamping-jaws moving in said ways, an inner tube provided with slots through which the jaws project and which the jaws are adapted to fit whereby the jaws and the inner tube move together longitudinally, and a spring for normally pressing the inner tube forward so as to bring the jaws into their innermost position, both the inner and outer tubes being provided with slots to permit the passage of the saws, substantially as set forth.

32. In a machine for splitting ratan, wood, or other material, a centering-chuck, consisting of the supporting-tube 184 provided with the diverging ways 185, the clamping-jaws 186, provided with the grooves 187, the inner tube 188, and the spring 191, substantially as set forth.

33. In a machine for splitting ratan, wood, or other material, the combination of a plurality of saw-frames adapted to revolve in opposite directions around the center line of the path of the material, saws carried by said frames, mechanism for operating the frames, and mechanism for operating the saws, and a centering-chuck supported centrally in the path of the material, consisting of a supporting-tube provided with ways, clamping-jaws moving in said ways and normally pressed against the material, and means for causing the jaws to move with one another either toward or away from the material.

34. In a machine for splitting ratan, wood, or other material, the combination of a plurality of saw-frames adapted to revolve in opposite directions around the center line of the path of the material, saws carried by said frames, saw-guides revolving with the saw-frames, mechanism for operating the frames, and mechanism for operating the saws, and a centering-chuck supported centrally in the path of the material, consisting of a supporting-tube provided with ways, clamping-jaws moving in said ways and normally pressed against the material, and means for causing the jaws to move with one another either toward or away from the material.

35. In a machine for splitting ratan, wood, or other material, the combination of a plurality of saw-frames adapted to revolve in opposite directions around the center line of the path of the material, saws carried by said frames, mechanism for operating the frames, and mechanism for operating the saws, and a centering-chuck supported centrally in the path of the material, consisting of a supporting-tube provided with inclined ways diverging toward the rear of the machine, clamping-jaws moving in said ways, and means for normally pressing the jaws forward to their innermost position with a yielding pressure, and means for causing the jaws to move with one another, substantially as set forth.

36. In a machine for splitting ratan, wood or other material, the combination of a plurality of saw-frames adapted to revolve in opposite directions around the center line of the path of the material, saws carried by said frames, saw-guides revolving with the saw-frames, mechanism for operating the frames, and mechanism for operating the saws, and a centering-chuck supported centrally in the path of the material, consisting of a supporting-tube provided with ways, clamping-jaws moving in said ways and normally pressed against the material, and means for causing the jaws to move with one another either toward or away from the material.

37. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, saw-guides revolving with the saw-frames, mechanism for operating the saw-frames and mechanism for revolving the saw-wheels, and one or more centering-chucks supported centrally in the path of the material, consisting of a supporting-tube provided with inclined ways, diverging toward the rear of the machine, clamping-jaws moving in said ways, an inner tube provided with slots through which the jaws project and which the jaws are adapted to fit, and a spring for normally pressing the inner tube forward so as to bring the jaws into their innermost position.

38. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, saw-guides revolving with the saw-frames, mechanism for operating the saw-frames and mechanism for revolving the saw-wheels, and one or more centering-chucks supported centrally in the path of the material, consisting of a supporting-tube provided with inclined ways, diverging toward the rear of the machine, clamping-jaws moving in said ways, an inner tube provided with slots through which the jaws project and which the jaws are adapted to fit, and a spring for normally pressing the inner tube forward so as to bring the jaws into their innermost position, both the inner and the outer tubes being provided with slots to permit the passage of the saws.

39. In a machine for splitting ratan, wood, or other material, the combination substantially as set forth, of two saw-frames adapted to revolve in opposite directions around the center line of the path of the material, saw-wheels journaled in bearings in the saw-frames, band-saws carried by the wheels, saw-guides revolving with the saw-frames but on independent fixed bearings so as to have no endwise motion, mechanism for operating the saw-frames and mechanism for revolving the saw-wheels, and one or more centering-chucks supported centrally in the path of the material consisting of a supporting-tube provided with inclined ways, diverging toward the rear of the machine, clamping-jaws moving in said ways, and means for normally pressing the jaws forward to their innermost position with a yielding pressure, and means for causing the jaws to move with one another.

40. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, saw-guides revolving with the saw-frames but on independent fixed bearings so as to have no sidewise motion, mechanism for operating the saw-frames and mechanism for revolving the saw-wheels, and one or more centering-chucks supported centrally in the path of the material, consisting of a supporting-tube provided with inclined ways, diverging toward the rear of the machine, clamping-jaws moving in said ways, an inner tube provided with slots through which the jaws project and which the jaws are adapted to fit, and a spring for normally pressing the inner tube forward so as to bring the jaws into their innermost position, both the inner and the outer tubes being provided with slots to permit the passage of the saws.

41. In a machine for splitting ratan, wood, or other material, the combination, substantially as set forth, of a saw-frame adapted to revolve around the center line of the path of the material, saw-wheels journaled in bearings in the saw-frame, band-saws carried by the wheels, a saw-guide revolving with the saw-frame but on an independent fixed bearing so as to have no sidewise motion, a centering-chuck supported centrally in the path of the material consisting of a supporting-tube provided with inclined ways, diverging toward the rear of the machine, clamping-jaws moving in said ways and means for normally pressing the jaws forward to their innermost position with a yielding pressure, and means for causing the jaws to move with one another, mechanism for operating the saw-frame and mechanism for revolving the saw-wheels.

42. In a machine for splitting ratan, wood or other material, the combination, substantially as set forth, of a saw-frame adapted to revolve around the center line of the path of the material, saw-wheels journaled in bearings in the saw-frame, band-saws carried by the wheels, a saw-guide revolving with the saw-frame but on an independent fixed bearing so as to have no sidewise motion, a centering-chuck supported centrally in the path of the material consisting of a supporting-tube provided with slots to permit the passage of the saws and provided with inclined ways, diverging toward the rear of the machine, clamping-jaws moving in said ways and means for normally pressing the jaws forward to their innermost position with a yielding pressure, and means for causing the jaws to move with one another, mechanism for operating the saw-frame and mechanism for revolving the saw-wheels.

43. In a machine for splitting ratan, wood, or other material, the combination substantially as set forth, of two saw-frames adapted to revolve in opposite directions around the center line of the path of the material, saw-wheels journaled in bearings in the saw-frames, band-saws carried by the wheels, saw-guides revolving with the saw-frames, mechanism for operating the saw-frames and mechanism for revolving the saw-wheels, and two centering-chucks one for each saw-frame supported centrally in the path of the material and revolving with the saw-frames, each consisting of a supporting-tube provided with inclined ways diverging toward the rear of the machine, clamping-jaws moving in said ways, the jaws of the front chuck being placed at the rear end of said chuck, and the jaws of the rear chuck being placed at the front end of said chuck whereby the jaws of the two chucks are in close proximity between the saw-frames, and means for normally pressing the jaws of each chuck forward to their innermost position with a yielding pressure, and means for causing the jaws of each chuck to move with one another, the supporting-tubes of the chucks having slots to permit the passage of the saws.

44. In a machine for splitting ratan, wood, or other material, the combination substantially as set forth, of two saw-frames adapted to revolve in opposite directions around the center line of the path of the material, saw-wheels journaled in bearings in the saw-frames, band-saws carried by the wheels, saw-guides revolving with the saw-frames, but on independent fixed bearings so as to have no sidewise motion, mechanism for operating the saw-frames and mechanism for revolving the saw-wheels, and two centering-chucks one for each saw-frame supported centrally in the path of the material and revolving with the saw-frames, each consisting of a supporting-tube provided with inclined ways diverging toward the rear of the machine, clamping-jaws moving in said ways, the jaws of the front chuck being placed at the rear end of said chuck, and the jaws of the rear chuck being placed at the front end of said chuck whereby the jaws of the two chucks are in close proximity between the saw-frames, and means for normally pressing the jaws of each chuck forward to their innermost position with a yielding pressure, and means for causing the jaws of each chuck to move with one another, the supporting-tubes of the chucks having slots to permit the passage of the saws.

45. In a machine for splitting ratan, wood, or other material by means of a band-saw, a guiding device for the saw consisting of the movable side guide-plates 159, the adjusting-screws 160, the adjustable back guide-plate 161 upon which the guide-plates 159 rest and bear, the clamping-plate 162 adapted to bear against the front surface of the guide-plates 159, and a support to hold the guide-plates and to which the clamping-plate can be secured, substantially as set forth.

46. In a machine for splitting ratan, wood, or other material, the combination, substantially as set forth, of a saw-frame adapted to revolve around the center line of the path of the material, saw-wheels journaled in bearings in the saw-frame, two band-saws carried by the wheels and crossing each other at the center line of the material, a guiding device for each saw revolving with the saw-frame and composed of two parts, one on each side of path of the material, each part consisting of movable side guide-plates, screws for adjusting the same sidewise so as to keep the saw in line with the center of the material being split, and a back guide-plate adjustable transversely of the direction of motion of the saw, and means for holding the guide-plates in place.

47. In a machine for splitting ratan, wood or other material, the combination, substantially as set forth, of a saw-frame adapted to revolve around the center line of the path of the material, saw-wheels journaled in bearings in the saw-frame, two band-saws carried by the wheels and crossing each other at the center line of the material, a guiding device for each saw revolving with the saw-frame but on an independent fixed bearing so as to have no sidewise motion, and composed of two parts one on each side of the path of the material.

48. In a machine for splitting ratan, wood or other material, the combination, substantially as set forth, of a saw-frame adapted to revolve around the center line of the path of the material, saw-wheels journaled in bearings in the saw-frame, two band-saws carried by the wheels and crossing each other at the center line of the material, a guiding device for each saw revolving with the saw-frame, but on an independent fixed bearing so as to have no sidewise motion, and composed of two parts one on each side of the path of the material, each part consisting of movable side guide-plates, screws for adjusting the same sidewise so as to keep the saw in line with the center of the material being split, and a back guide-plate adjustable transversely of the direction of motion of the saw, and means for holding the guide-plates in place.

49. In a machine for splitting ratan, wood, or other material, the combination, substantially as set forth, of a saw-frame adapted to revolve around the center line of the path of the material, saw-wheels journaled in bearings in the saw-frame, two band-saws carried by the wheels, the guiding device for the saws, provided with four sets of side guide-plates 159, and adjusting-screws, and with a back guide-plate 161 for each set, and clamping-plates 162, the fixed bearing-plate 163 upon which the guiding device turns, and the locking-bolt 169.

50. In a machine for splitting ratan, wood or other material, the combination, substantially as set forth, of two saw-frames adapted to revolve in opposite directions around the center line of the path of the material, saw-wheels journaled in bearings in the saw-frames, two band-saws carried by the wheels of each saw-frame, a guiding device for the saws of the front saw-frame revolving with the saw-frame provided with four sets of side guide-plates 175, adjusting-screws 176, a back guide-plate 179 for each set, clamping-plates 178, a supporting-plate 174, and means for fastening the supporting-plate in place, and a guiding device for the rear saw-frame revolving therewith, provided with four sets of side guide-plates 159, adjusting-screws 160, a back guide-plate 161 for each set, clamping-plates 162 and a supporting-plate 158 and means for fastening the supporting-plate in place.

51. In a machine for splitting ratan, wood or other material, the combination, substantially as set forth, of two saw-frames adapted to revolve in opposite directions around the center line of the path of the material, saw-wheels journaled in bearings in the saw-frames, two band-saws carried by the wheels of each saw-frame, a guiding device for the saws of the front saw-frame revolving with the saw-frame, but on an independent fixed bearing so as to have no sidewise motion, provided with four sets of side guide-plates 175, adjusting-screws 176, a back guide-plate 179 for each set, clamping-plates 178, a supporting-plate 174, and means for fastening the supporting-plate in place, and a guiding device for the rear saw-frame revolving therewith but on an independent fixed bearing so as to have no sidewise motion, provided with four sets of side guide-plates 159, adjusting-screws 160, a back guide-plate 161 for each set, clamping-plates 162, and a supporting-plate 158 and means for fastening the supporting-plate in place.

52. In a machine for splitting ratan, wood or other material, the combination of a cutter-frame adapted to revolve around the center line of the path of the material, cutters carried by said frame, mechanism for revolving the frame, a pivoted arm lying in the path of the material and adapted to be tripped thereby and connected with the mechanism for revolving the frame, whereby when the material trips the arm, the said mechanism is put into operation, and the frame revolved, substantially as set forth.

53. In a machine for splitting ratan, wood, or other material, the combination of a cutter-frame adapted to revolve around the center line of the path of the material, cutters carried by said frame, a driving-shaft connected with the cutter-frame to operate the same, a second driving-shaft, a clutching device adapted to connect or disconnect the two shafts, a pivoted arm lying in the path of the material and adapted to be tripped thereby, a dog adapted to engage with and hold the clutching device out of operative position, and connected with the pivoted arm, and means for throwing the clutching device into operative position when the dog is withdrawn, whereby when the material strikes the arm, the arm is thrown back and the dog is withdrawn from the clutch and the two shafts are operatively connected, substantially as set forth.

54. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, a driving-shaft connected with the saw-frames to operate the same, a second driving-shaft, a clutch adapted to connect or disconnect the two shafts, a sliding plate carrying the clutch, a second sliding plate attached to the first sliding plate by a spring connection, a pivoted arm lying in the path of the material and adapted to be tripped thereby, a dog adapted to engage with and hold the first sliding plate so as to keep the clutch out of operative position, and connected to the pivoted arm, and means for operating the second sliding plate, whereby when the material strikes the pivoted arm, the arm is thrown back, the dog is withdrawn from the first sliding plate and that sliding plate and the clutch are thrown into operative position by the spring connection so as to connect the two shafts.

55. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, the driving-shaft 38, the second driving-shaft 45, the sliding plate 65, and means for reciprocating the same, the sliding plate 70, a clutching-sleeve 85 carried by said plate 70, the sleeves 88, 89, revolving loosely on the shaft 45, and adapted to be fastened thereto by the clutch, means for connecting the sleeves with the shaft 38, a spring connection between the two sliding plates, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

56. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, the driving-shaft 38, the second driving-shaft 45, the sliding plate 65, and means for reciprocating the same, the sliding plate 70, the arm 73, the rock-shaft 72, the spring 74 connected with the plate 70, a clutching-sleeve 85 carried by said plate 70, the sleeves 88, 89, revolving loosely on the shaft 45, and adapted to be fastened thereto by the clutch, means for connecting the sleeves with the shaft 38, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

57. In a machine for splitting ratan, wood, or other material, the combination, substantially as set forth, of two saw-frames adapted to revolve in opposite directions around the center line of the path of the material, saw-wheels journaled in bearings in the saw-frames, band-saws carried by the wheels, mechanism for revolving the saw-wheels, the driving-shaft 38, the second driving-shaft 45, the sliding plate 65, and means for reciprocating the same, the sliding plate 70, the arm 73, the rock-shaft 72, the spring 74 connected with the plate 70, the pawls 76, 77 adapted to engage in recesses in the plate 70, the springs 79, the tripping devices 82, 83 attached to the plate 65, and adapted to strike and to disengage the pawls, a clutching-sleeve 85 carried by said plate 70, the sleeves 88, 89, revolving loosely on the shaft 45, and adapted to be fastened thereto by the clutch, means for connecting the sleeves with the shaft 38, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

58. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, mechanism for revolving the saw-wheels, the driving-shaft 38, the second driving-shaft 45, the sliding plate 65, and means for reciprocating the same, the sliding plate 70, the arm 73, the rock-shaft 72, the spring 74 connected with the plate 70, a clutching-sleeve 85 carried by said plate 70, the sleeves 88, 89, revolving loosely on the shaft 45, and having the cone-gears 96, 97, and means for connecting any part of the cone-gear with the shaft 38, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

59. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, mechanism for revolving the saw-wheels, the driving-shaft 38, the second driving-shaft 45, the sliding plate 65, and means for reciprocating the same, the sliding plate 70, the arm 73, the rock-shaft 72, the spring 74 connected with the plate 70, a clutching-sleeve 85 carried by said plate 70, the sleeves 88, 89, revolving loosely on the shaft 45, and having the cone-gears 96, 97, the gears 100, 101 adapted to slide on the shaft 38 but to turn therewith, the arms 102, 103 pivoted on the shaft 38 but sliding thereon with the gears 100, 101, intermediate gears carried by the arms 102, 103 and adapted to connect the gears 100, 101 with any part of the gear-cones 96, 97, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

60. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, mechanism for revolving the saw-wheels, the driving-shaft 38, the second driving-shaft 45, the sliding plate 65, and means for reciprocating the same, the sliding plate 70, the arm 73, the rock-shaft 72, the spring 74 connected with the plate 70, a clutching-sleeve 85 carried by said plate 70, the sleeves 88, 89, revolving loosely on the shaft 45, and having the cone-gears 96, 97, the gears 100, 101 adapted to slide on the shaft 38 but to turn therewith, the arms 102, 103 pivoted on the shaft 38 but sliding thereon with the gears 100, 101, intermediate gears carried by the arms 102, 103 and adapted to connect the gears 100, 101 with any part of the gear-cones 96, 97, the intermediate gears on one arm 102 being so arranged as to cause the shaft 38 to revolve in one direction, and the intermediate gears on the other arm 103 being so arranged as to cause the shaft 38 to revolve in the other direction, the pivoted arm 46 lying in the path of the material and adapted to be tripped thereby, the dog 57, adapted to engage in a recess in the sliding plate 70, the spring 63, the pawl 55, and the rock-shaft 54, connected with the arm 46.

61. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, mechanism for revolving the saw-wheels, the driving-shaft 38, the second driving-shaft 45, the sliding plate 65 and means for reciprocating the same, the sliding plate 70, the arm 73, the rock-shaft 72, the spring 74 connected with the plate 70, a clutching-sleeve 85 carried by said plate 70, the sleeves 88, 89 revolving loosely on the shaft 45 and having the cone-gears 96, 97, the gears 100, 101, adapted to slide on the shaft 38 but to turn therewith, the arms 102, 103 pivoted on the shaft 38 but sliding thereon with the gears 100, 101, intermediate gears carried by the arms 102, 103 and adapted to connect the gears 100, 101 with any part of the gear-cones 96, 97, the intermediate gears on one arm 102 being so arranged as to cause the shaft 38 to revolve in one direction and the intermediate gears on the other arm 103 being so arranged as to cause the shaft 38 to revolve in the other direction, and slotted arms 108 to which the ends of the arms 102 and 103 can be bolted, the sliding plates 111 carrying the slotted arms, rack 113, the pawl 114, the spring 115, the pivoted arm 46 lying in the path of the material and adapted to be tripped thereby, the dog 57 adapted to engage in a recess in the sliding plate 70, the spring 63, the pawl 55 provided with a tongue or bearing piece 59 pivoted to the pawl, the stop-pin 61, the spring 62 and the rock-shaft 54 connected with the arm 46.

62. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, the revolving screw 27, the pivoted frame 28 in which the screw is journaled, the shaft 38 connected with the screw by suitable gearing, the traveling nut 32, the sliding sleeves 116, 117, the lever 120, 122 pivoted to the frame, the connecting-rods 121, 123, the bell-crank lever 124, the connecting-rod 69, the sliding plate 65, the driving-shaft 45, the sliding plate 70, the arm 73, the rock-shaft 72, the spring 74 connected with the plate 70, the clutching-sleeve 85 carried by the plate 70, sleeves 88, 89 revolving loosely on the shaft 45 and having the cone-gears 96, 97, the gears 100, 101 adapted to slide on the shaft 38 but to turn therewith, the arms 102, 103 pivoted on the shaft 38 but sliding thereon with the gears 100, 101, intermediate gears carried by the arms 102, 103 and adapted to connect the gears 100, 101, with any part of the gear-cones 96, 97, the intermediate gears on one arm 102 being so arranged as to cause the shaft 38 to revolve in one direction, and the intermediate gears on the other arm 103 being so arranged as to cause the shaft 38 to revolve in the other direction, the pivoted arm 46 lying in the path of the material and adapted to be tripped thereby, the dog 57 adapted to engage in a recess in the sliding plate 70, the spring 63, pawl 55, the rock-shaft 54 connected with the arm 46, the driving-shaft 128, the pulleys 130, the swinging frames 131, the counter-shafts 132, the pulleys 133, 134, the belts 135, the belts 138, the pulleys 137 on the saw-wheel shafts, two centering-chucks, one for each saw-frame supported centrally in the path of the material and revolving with the saw-frames, each consisting of a supporting-tube 184 provided with the diverging ways 185, clamping-jaws 186, the inner tube 188, and the spring 191, a guiding device for the saws of the front saw-frame revolving with the saw-frame and provided with four sets of guide-plates 175, the adjusting-screws 176, back guide-plates 179, clamping-plates 178, and a supporting-plate 174 adapted to turn on the fixed bearing-plate 163, the locking-bolt 169, and a guiding device for the rear saw-frame revolving therewith, provided with four sets of guide-plates 159, adjusting-screws 160, back guide-plates 161, clamping-plates 162, and a supporting-plate 158 adapted to turn on the fixed bearing-plate 163, and having its locking-bolt 169, the feed-rolls 140, sliding plates 141, cushions 142, the pivoted arms 143, the worm-wheels 148, worms 149, shafts 150, 151 and 152, the gears 153, the gears 154 and the intermediate gears 155.

63. In a machine for splitting ratan, wood, or other material, the combination, substantially as set forth, of two saw-frames adapted to revolve in opposite directions around the center line of the path of the material, saw-wheels journaled in bearings in the saw-frame, band-saws carried by the wheels, revolving screws, one for each saw-frame, journaled in suitable frames, nuts traveling on said screws and connected with the saw-frames, a driving-shaft for the saw-frames so connected with both of said screws as to revolve the saw-frames in opposite directions at the same time, sliding sleeves on one of the screws against which the nut on that screw is adapted to strike, a second driving-shaft, a clutch adapted to connect or disconnect the two shafts, a sliding plate carrying the clutch, a second sliding plate attached to the first sliding plate by a spring connection, mechanism for connecting the sliding sleeves on the saw-frame screw, with the second sliding plate so as to reciprocate the latter, a pivoted arm lying in the path of the material and adapted to be tripped thereby, a dog adapted to engage with and hold the first sliding plate in a middle position so as to keep the clutch out of operative position, the dog being connected to the pivoted arm, a driving-shaft for the saw-wheels, swinging frames pivoted on the driving-shaft, counter-shafts carried by the swinging frames, a link for each swinging frame pivoted at one end to the shaft of one of the saw-wheels, and at the other end to the counter-shaft of one of the swinging frames, and means for imparting motion from the driving-shaft to the counter-shafts and from the counter-shafts to the saw-wheel shafts, two centering-chucks, one for each saw-frame, supported centrally in the path of the material and revolving with the saw-frames, each consisting of a supporting-tube provided with inclined ways diverging toward the rear of the machine, and clamping-jaws moving in said ways, and an inner tube provided with slots through which the jaws project and which the jaws are adapted to fit, and a spring for normally pressing the inner tube forward so as to bring the jaws into their innermost position, a guiding device for each of the saw-frames adapted to revolve with the saw-frame, consisting of movable side guide-plates, screws for adjusting the same sidewise, back guide-plates back of the side guide-plates and adjustable transversely of the direction of motion of the saws, clamping-plates to hold the guide-plates in place, feed-rolls on opposite sides of the path of the material, both at the front and at the rear of the machine, mounted in bearings in sliding plates pressed toward each other with a yielding pressure, worm-wheels on the shafts of the outer feed-rolls, worms with which the worm-wheels mesh, and driving-shafts carrying the worms and connected with the main driving-shaft of the machine.

In testimony whereof we have signed our names to this specification in the presence of two subscribing witnesses.

JULIAN POMEROY.
HENRY W. LARSSON.

Witnesses:
GEORGE PIRNIE,
RALPH W. ELLIS.